(12) United States Patent
Hebert et al.

(10) Patent No.: US 12,346,431 B2
(45) Date of Patent: Jul. 1, 2025

(54) INJECTION ATTACK SENSOR WITH SYNTAX ATTACK DETECTION TEMPLATE

(71) Applicant: SAP SE, Walldorf (DE)

(72) Inventors: Cedric Hebert, Mouans Sartoux (FR); Thomas Barber, Stutensee (DE); Suv Sanjit Patnaik, Bengaluru (IN)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 18/114,895

(22) Filed: Feb. 27, 2023

(65) Prior Publication Data

US 2024/0291858 A1    Aug. 29, 2024

(51) Int. Cl.
| | |
|---|---|
| G06F 21/54 | (2013.01) |
| G06F 21/55 | (2013.01) |
| G06F 21/56 | (2013.01) |
| H04L 9/40 | (2022.01) |
| H04W 12/12 | (2021.01) |

(52) U.S. Cl.
CPC .............. *G06F 21/54* (2013.01); *G06F 21/55* (2013.01); *G06F 21/566* (2013.01); *H04L 63/1425* (2013.01); *H04L 63/1466* (2013.01); *H04W 12/12* (2013.01); *G06F 21/56* (2013.01); *H04L 63/14* (2013.01)

(58) Field of Classification Search
CPC .......... G06F 21/50; G06F 21/51; G06F 21/54; G06F 21/56; G06F 21/55; G06F 21/577; G06F 21/566; H04L 63/14; H04L 63/1433; H04L 63/145; H04L 63/1466; H04L 63/1425; H04L 63/1491

See application file for complete search history.

(56) References Cited

U.S. PATENT DOCUMENTS

| | | | | |
|---|---|---|---|---|
| 10,581,879 | B1* | 3/2020 | Paithane | G06F 21/566 |
| 10,783,243 | B2* | 9/2020 | Loch | G06F 12/1416 |
| 2014/0123280 | A1* | 5/2014 | Kedma | G06F 11/3003 726/23 |
| 2020/0195686 | A1* | 6/2020 | Johns | G06F 16/221 |
| 2021/0067552 | A1 | 3/2021 | Hebert et al. | |
| 2021/0157917 | A1 | 5/2021 | Hebert et al. | |
| 2021/0160277 | A1 | 5/2021 | Hebert et al. | |
| 2022/0067172 | A1* | 3/2022 | Bonetta | G06F 21/577 |
| 2022/0103545 | A1 | 3/2022 | Hebert et al. | |

(Continued)

OTHER PUBLICATIONS

Papagiannis et al., PHP Aspis: Using Partial Taint Tracking to Protect Against Injection Attacks, 2011, PDF: pp. 1-2 (Year: 2011).*

(Continued)

*Primary Examiner* — Shaqueal D Wade-Wright
(74) *Attorney, Agent, or Firm* — Klarquist Sparkman, LLP

(57) ABSTRACT

A tainting engine can work in conjunction with a syntax attack detection template to identify when a threat actor attempts a malicious attack in a cloud application scenario. Non-intrusive instrumentation can be used to provide detection of an attempted attack regardless of whether the cloud application is vulnerable to such attacks. Detection of attempted attacks can be an important part of maintaining network security, even in cases where an application itself is not vulnerable to such attacks. Further details about the attempted attack can be assembled, and a variety of actions can be taken in response to detection.

18 Claims, 15 Drawing Sheets

(56) References Cited

U.S. PATENT DOCUMENTS

2022/0109692 A1 4/2022 Hebert et al.
2022/0197998 A1 6/2022 Barber et al.

OTHER PUBLICATIONS

"The RASP market size is expected to grow . . . " Cision PR Newswire, prnewswire.com, Jan. 8, 2018, 3 pages.
Bell et al., "Phosphor: Illuminating Dynamic Data Flow in Commodity JVMs," 29th Annual ACM Conference on Object-Oriented Programming, Systems, Languages & Applications (OOPSLA '14), 2014, 19 pages.
Lekies et al., "25 Million Flows Later—Large-scale Detection of DOM-based XSS," CCS'13, Nov. 4-8, 2013, Berlin, Germany, 2013, 12 pages.
Loch et al., "Hybrid Taint Analysis for Java EE," Sac '20, Mar. 30-Apr. 3, 2020, Brno, Czech Republic, 2020, 10 pages.
Shipilev et al., "JEP 280: Indify String Concatenation," OpenJDK, Oracle Corporation, 2017, 4 pages.
"Cross Site Scripting Prevention Cheat Sheet," OWASP Cheat Sheet Series, cheatsheetseries.owasp.org, visited Jan. 31, 2023, 10 pages.
"SQL Syntax," w3resource, w3resource.com, Aug. 19, 2022, 18 pages.
"SQL Syntax," Wikipedia, en.wikipedia.org, Dec. 1, 2022, 12 pages.
European Search Report, received in counterpart European Application No. 23193800.2, Jan. 30, 2024, 7 pages.
Parameshwaran et al., "Auto-patching DOM-Based XSS at Scale," *User Interface Software and Technology*, ACM, 2 Penn Plaza, Suite 701, New York, NY, Aug. 30, 2015, pp. 272-283, 12 pages.
Chang et al., "Analyzing and defending against web-based malware," *ACM Computing Surv.*, ACM, New York, NY, Aug. 30, 2013, pp. 1-35, 35 pages.
Mendoza et al., "Mobile Application Web API Reconnaissance: Web-to-Mobile Inconsistencies & Vulnerabilities," 2018 *IEEE Symposium on Security and Privacy*, IEEE, May 20, 2018, pp. 756-769, 14 pages.

* cited by examiner

```
1 String foo(String arg) {
2 if("bar".equals(arg)) {
3 return "Equal";
4 }
5 return "NotEqual";
6 }
```

1005

```
1 java.lang.String foo(java.lang.String);
2 descriptor: (Ljava/lang/String;)Ljava/lang/String;
3 Code:
4 0: ldc #2 // String bar
5 2: aload_0
6 3: invokevirtual #3 // Method java/lang/String.equals:(Ljava/lang/Object;)Z
7 6: ifeq 12
8 9: ldc #4 // String Equal
9 11: areturn
10 12: ldc #5 // String NotEqual
11 14: areturn
```

1010

```
1 com.sap.TString foo(com.sap.TString);
2 descriptor: (Lcom/sap/TString;)Lcom/sap/TString;
3 Code:
4 0: ldc #2 // String bar
5 2: aload_0
6 3: invokevirtual #3 // Method com/sap/TString.equals:(Ljava/lang/Object;)Z
7 6: ifeq 12
8 9: ldc #4 // String Equal
9 11: areturn
10 12: ldc #5 // String NotEqual
11 14: areturn
```

1015

```
1 String str = (String) Class.forName("java.lang.String")
2 .getConstructor()
3 .newInstance();
```

INJECTION ATTACK SENSOR WITH SYNTAX ATTACK DETECTION TEMPLATE

FIELD

The field generally relates to computer network security, and particularly to computer network security in a cloud context.

BACKGROUND

Maintaining computer network security remains an elusive goal, especially in the cloud context. A number of approaches have been tried, such as web application firewalls, intrusion detection systems, and static code analysis. Early intrusion detection is helpful, but it is no easy task to determine when an attempt is successful, let alone when unsuccessful attacks are being attempted.

One nagging problem with many solutions is that they attempt to generically solve a problem that unfortunately manifests itself in the particularities of a given software application. For example, web application firewalls can inspect data, but are removed from the actual execution within an application. Static code analysis on the other hand is close to the internal logic of the application but does not benefit from observing how actual data coming into the application affects execution.

There thus remains a need for improved methods of detecting network intrusion attempts by threat actors.

BRIEF DESCRIPTION OF THE DRAWINGS

FIG. 10 shows example Java based code snippets illustrating bytecode code instrumentation, according to one embodiment.

DETAILED DESCRIPTION

Example 1—Overview

Figure 1:
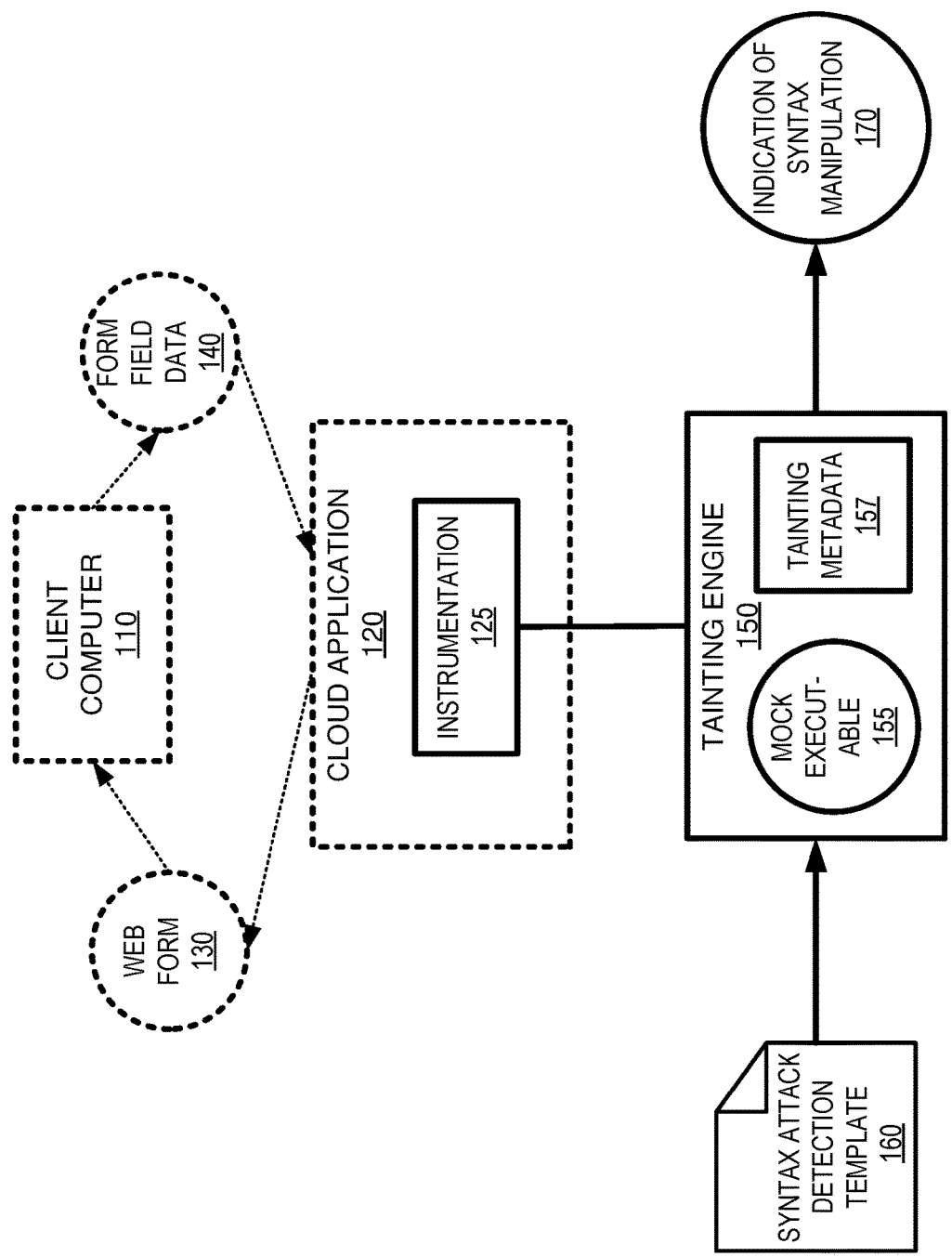
FIG. 1 is a block diagram of an example system implementing an injection attack sensor with a syntax attack detection template.

One particularly troublesome form of computer network attack is the code injection attack. Such attacks can involve client-side cross-site scripting (XSS), tampering with structured query language clauses, and the like. In such attacks, incoming data (e.g., ostensibly user input) can affect the execution flow of an application beyond what was intended by the software developers. Clever threat actors can use such vulnerabilities in creative ways to gain unauthorized access to the computing system.

Techniques such as web application firewalls (WAF) and intrusion detection systems (IDS) can be used to address such attacks, but they are prone to both false positives as well as false negative alerts. False positives lead to alert fatigue, where auditors miss real attacks because they appear to be yet another false positive. False negatives serve as a blind spot for auditors.

An attack-aware application is able to detect when it is attacked and can react accordingly (e.g., by sending an alert to an on-duty monitoring team). Having the application perform detection has a dual advantage in that it can be more accurate and thorough than a web application firewall because the application contains the underlying logic that processes any incoming data. However, creating an attack-aware application remains complex because it involves extra development effort, and the development team needs to be security-aware so that the detection they put into place reflects the techniques used by the adversaries.

Dynamic dataflow tracking ("tainting") is a powerful technique to mark and monitor potentially harmful dataflow within an application. Taint-aware frameworks can have other uses, such as to assign and track the flow of personal information to ensure compliance with data-protection laws such as the European General Data Protection Regulation (GDPR).

The technologies described herein can leverage the identification of tainted data in an executable statement context in combination with a template-based approach that can detect attempted attacks, even if they are avoided or unsuccessful. For example, a cloud application may well be capable of avoiding an attack, but the technologies described herein can detect the attempted attack via a template and send an appropriate alert.

Applications can be automatically, non-intrusively instrumented, making them able to detect accurately and alert on a number of observed injection attacks with a reduced number of false positives and false negatives. Thus, any application can be transformed into an automated sentinel that assists in the effort to detect threat actors.

Different levels of attempted attacks can be supported. For example, malformed input can be distinguished from malicious input as described herein.

Instrumentation of the cloud application can be achieved in a non-intrusive manner. For example, class substitution can be used, and the substituted class can call the former class to maintain expected functionality.

Various advantages can result from the technologies. For example, in cases where detection of an attempted attack is done closer to the application (e.g., based on information accessed from within the application as it is executing in real time), detection can leverage how the cloud application is actually using the data instead of a generic approach that attempts to cover all use cases. Being closer to the application can lead to both fewer false negatives and fewer false positives. Thus, the accuracy and reliability of alerts is improved, avoiding alert fatigue.

Also, detecting an attempted attack before it is successful can be very valuable in a threat intelligence or computer network security context. Often threat actors spend some time probing and attempting attacks before they are successful. As described herein, action can be taken before any attack is successful, and sometimes without the knowledge of the threat actor, leading to more successful surveillance and prevention of threat actor activities.

Other techniques such as automatically employing countermeasures can be used as described herein.

The described technologies thus offer considerable improvements over conventional network security techniques.

Example 2—Example System Implementing an Injection Attack Sensor with a Syntax Attack Detection Template FIG. 1 is a block diagram of an example system 100 implementing an injection attack sensor with a syntax attack detection template. In the example, the system 100 operates in a cloud environment comprising a client computer 110 in communication with a cloud application 120. For example, the client computer 110 can comprise a browser sending HTTP requests to the cloud application 120. As shown, a web form 130 can be sent to the client computer, which responds with form field data 140. Typically, a user enters data into form fields appearing in a rendered version of the web form 130 in the browser. However, in a security context, there may be no browser (or a so-called "headless browser"), and entry of the data may be automated. Although HTML forms can be used, other alternatives include passing data in a URL, or the like.

The cloud application 120 can comprise instrumentation 125 that supports the tainting engine 150. Instrumentation can be achieved in a number of ways, such as class substitution, manual instrumentation, or the like. As described herein, the cloud application 120 can have its own attack avoidance logic so that it is not vulnerable to attack. Nevertheless, detection of an attempted attack, even if avoided, can still have benefits as described herein.

The tainting engine 150 is configured to track which data is provided from the client computer 110 (e.g., the form field data) and trace its use in the cloud application 120 via tainting metadata 157. The tainting engine 150 can intercept executable statements before they are executed.

For example, the tainting engine can determine whether a string (e.g., to be executed) contains data received from the client computer 110 and which portions (e.g., ranges) of the string are tainted (e.g., were received from the client computer 110). As described herein, the tainting engine 150 can store the units of data coming from the client computer and generate a mock executable statement 155, wherein such generating comprises combining a given unit of tainted data with a syntax attack detection template 160. The tainting engine is operable to analyze the mock executable statement 155 to determine whether the tainted data has manipulated the syntax of the mock executable statement 155. If so, the tainting engine 150 is configured to output an indication 170 of syntax manipulation.

Although a single template 160 is shown in the example, a plurality of templates can be used in practice.

As described herein, the indication 170 can be used to trigger any number of additional actions, such as countermeasures to an attack. The indication can take the form of an alert that is sent to other software to take appropriate actions (e.g., countermeasures or the like).

Any of the systems herein, including the system 100, can comprise at least one hardware processor and at least one memory coupled to the at least one hardware processor. In the example, the system also comprises an executable application configured to receive input from a browser, a stored syntax attack detection template, and a tainting engine configured to identify an input string received by the executable application from the browser that is incorporated into an executable statement generated by the application, wherein the tainting engine is further configured to generate a mock executable statement comprising the input string incorporated into a syntax attack detection template, determine that the input string manipulates syntax of the mock executable statement, and generate an alert upon determining that the input string does manipulate syntax of the mock executable statement.

Non-intrusive instrumentation within the application can detect the input string and provides the input string to the tainting engine.

The tainting engine can be configured to determine whether the syntax manipulation is categorized as malicious or malformed, wherein a determination of malformed is indicated by introduction of a syntax error (e.g., by the tainted data). The alert can indicate whether the syntax manipulation is categorized as malicious or malformed.

As described herein, a reverse proxy can collect details regarding a session from which the input string originated.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. For example, there can be more than one template 160. There can be different levels of indication 170 (e.g., "warning," "malicious," or the like). Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the syntax attack detection template 160, mock executable statement 155, tainting metadata 157, and the like can be stored in one or more computer-readable storage media or computer-readable storage devices. The technologies described herein can be generic to the specifics of operating systems or hardware and can be applied in any variety of environments to take advantage of the described features.

Figure 2:
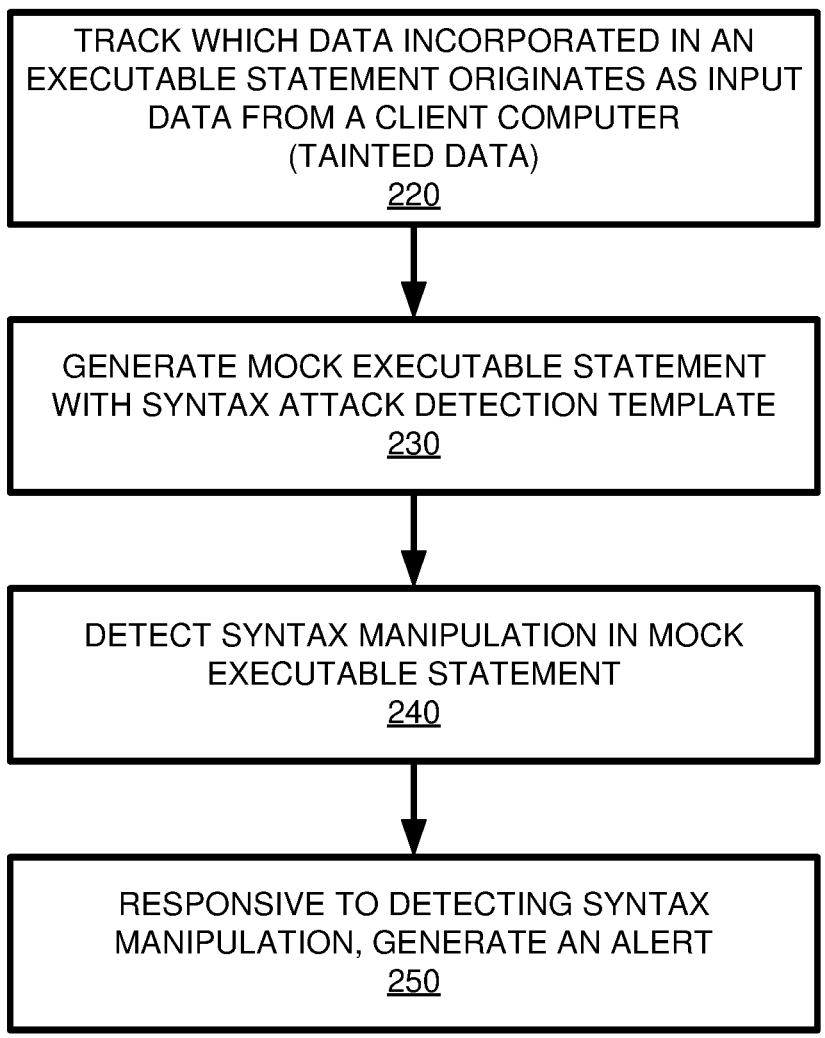
FIG. 2 is a flowchart of an example method of sensing an injection attack with a syntax attack detection template.

Example 3—Example Method Sensing an Injection Attack with a Syntax Attack Detection Template FIG. 2 is a flowchart of an example method 200 of sensing an injection attack with a syntax attack detection template and can be performed, for example, by the system of FIG. 1. The automated nature of the method 200 can be used in a variety of computer network security or threat intelligence scenarios such as detecting and monitoring threat actors, preventing and blocking attacks, or the like.

In the example, at 220, a tainting engine tracks which data incorporated in an executable statement originates as input data from a client computer. The tainting engine can achieve such tracking via instrumentation within a cloud application as described herein. As described herein, the tainting engine can produce units of data that originate as input data from the client computer (e.g., form field data such as input strings sent in response to a web form, parameters in URLs, or the like). Such data is designated as tainted data or tainted input data as described herein. The data to be included in the executable statement can originate as string data received from the client computer in response to an HTML form.

At 230, a mock executable statement is generated with a syntax attack detection template. In practice, a unit of tainted data is incorporated into the syntax attack detection template (e.g., as a parameter). The tainting engine can cycle through a plurality of units of tainted data, generating a separate mock executable statement for a given one of the units. An example mock executable statement can comprise an SQL statement in string form.

At 240, syntax manipulation by the tainted data in the mock executable statement is detected. As described herein, the mock executable statement can be parsed, and it can be determined whether a unit of tainted data spans boundaries between blocks in the parsed representation of the mock executable statement. Data that spans a boundary (e.g., is associated with more than one block), can be identified as manipulating syntax of the statement.

Detecting syntax manipulation can be performed in a variety of ways. For example, the mock executable statement can be parsed into multiple parsed tokens based on the syntax of the language of the executable statement. It can then be determined whether a unit of tainted input data spans more than one parsed token. Such parsing can parse into keywords and literals. Determining that a unit of tainted input data spans more than one parsed token can comprise determining that the unit spans a keyword-literal boundary.

Alternatively, it can be determined that a unit of tainted input data increases the number of parsed tokens as compared to the template (e.g., the number of expected tokens if a statement in the form of the template were parsed).

At 250, responsive to determining that the syntax of the statement has been manipulated by the tainted data, an alert is generated. As described herein, the alert can lead to any number of additional actions, such as countermeasures to an attack. For example, the alert can be sent to another computing system that determines how to handle it, whether to take automatic measures, or the like. The alert can be handled internally within the cloud application if desired.

It can be determined whether syntax manipulation is categorized as malicious or malformed. The alert can indicate whether the syntax manipulation is categorized as malicious of malformed.

Instrumentation can be performed non-intrusively as described herein. As described herein, instrumentation can be performed by a taint-aware class that is substituted for an original class in the cloud application.

Tracking which data incorporated in an executable statement originates as input data from a client computer can comprise intercepting the executable statement (e.g., an SQL query) generated by the cloud application (e.g., with instrumentation in the taint-aware class).

Generating the mock executable statement can comprise incorporating the tainted input data in place of a parameter in the syntax attack detection template.

The cloud application can comprise code injection attack blocking functionality that blocks a given code injection attack. Still, syntax manipulation by the tainted input data in the mock executable statement can be detected, whereby an attempted attack is separately detected via the mock executable statement even though the attempted attack is blocked by the cloud application.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, receiving data can be described as sending data depending on perspective.

Example 4—Example Cloud Application

In any of the examples herein, a cloud application can take the form of a web-based application. Such applications typically interact with client computers to collect information from remote users to achieve any of a variety of computing results. In practice, a browser can use HTTP requests that render HTML forms into which a browser can accept input data. Input data can also be provided as part of URLs.

The cloud application is designed to accept such input and perform further processing, such as querying a database, logging information, performing searches, or the like, using the parameters provided to the cloud application.

Example 5—Example Non-Vulnerable Cloud Application

In any of the examples herein, the technologies can be used in conjunction with non-vulnerable cloud applications. For example, even if the cloud application is configured to successfully block an attack of the attack type detected by technologies described herein (e.g., by detecting, mitigating, or avoiding effects of a special character or the like), the technologies described herein can separately detect the attack.

Even if the cloud application successfully blocks the attack, it remains beneficial in a computer network security or threat intelligence context to detect the attempted attack for a variety of reasons as described herein. The technologies described herein can thus detect such an attempt and provide an alert, even if cases where the cloud application is not vulnerable to the attack.

Example 6—Example Tainted Data

In any of the examples herein, so-called "tainted data" can be traced back to the client computer 110 as it moves through the cloud application 120. Such tainted data can include a variety of input data from the client computer, including form field data, parameters in Uniform Resource Locators (URLs), or the like collected from the client computer as part of processing by a cloud application.

In practice, a threat actor can carefully choose such input in an attempt to gain control of the computing system on which the cloud application executes. Initial steps may vary from attempting to gain greater execution privileges, inspecting unauthorized files or databases or the like. The number of possible attacks is difficult to quantify, but simply knowing that data originated from the client computer 110 can be helpful in determining whether such data is attempting to manipulate the syntax of an executable statement.

As described herein, such data can be in the form of a string, and the tainting engine can track such strings, ultimately incorporating (e.g., copying) them into the syntax attack detection template as described herein.

As described herein, tainted input data can be traced and provided by a tainting engine, an example of which is described below. The tainting engine can both identify input data received from the client computer and determine that it is incorporated in (e.g., copied into) an executable statement by the cloud application. In other words, after an application is instrumented to implement the tainting engine, the tainting engine can intercept one or more SQL operations and detect whether a given operation out of the operations would lead to an injection attack.

As described herein, the tainting engine can be implemented by non-intrusive instrumentation that effectively tags or scrapes input data without altering the underlying logic of the application. The tainting engine can be enhanced to operate in conjunction with a syntax attack detection template as described herein to detect attempted attacks.

Example 7—Example Syntax Attack Detection Template

As described herein, tainted data that is incorporated into an executable statement (e.g., by the cloud application) can be tested by incorporating such tainted data into a syntax attack detection template as described herein. In practice, some input may be tainted but not incorporated into an executable statement (e.g., the tainted input data is not copied into the executable statement in whole or in part). For example, a menu may allow a user to select a menu item or input a field that does not appear in an executable statement. Such tainted input data typically does not need to be tested for an attempted attack because it is not executed. However, there could still be reasons to analyze such data.

In any of the examples herein, a syntax attack detection template can be constructed to detect when a syntax attack is taking place. Any of a variety of such templates can be used, and in practice, more than one template can be used to test tainted input data to see if an attack is being attempted.

For example, different templates may be useful for different programming languages, variants (e.g., versions) of the same language, and the like.

Examples include the following in a SQL context:

```
SELECT id FROM dummy_table WHERE dummy_field = '"+input+"'
SELECT id FROM dummy_table WHERE dummy_field LIKE
   '"+input+"'
SELECT id FROM users
   WHERE username = ' "user" ' AND password = ' "+input+" '
```

In the examples, tainted input data can be substituted for the +input+field. In other words, the tainted input data can be copied into the template in place of the +input+field.

As described herein, a mock executable statement can be constructed by adding in the tainted input data for the parameter (+input+). Analysis of the impact of the tainted input data can then be performed to determine whether the syntax is being manipulated by the tainted data.

In practice, in the case of multiple units of detected tainted input data, a given unit can be incorporated into the template and analyzed; the remaining units can be similarly incorporated and analyzed (e.g., seriatim, one at a time, in parallel, or the like).

Example 8—Example Mock Executable Statement

In any of the examples herein, a mock executable statement can be constructed by incorporating tainted input data into the syntax attack detection template as described herein. As described herein, tainted data can be placed into the template (e.g., as a parameter).

The mock executable statement thus comprises the tainted input as well as the body of the template (e.g., other than the input parameter indication).

Examples herein show SQL statements as examples of mock executable statements, but such statements can be written in any programming language that can have its syntax manipulated by tainted input data.

As described herein, the mock executable statement is typically not executed. Instead, it can be parsed, and the results of parsing can be correlated with the impact of the tainted input data. Failure to parse can itself be an indication of the impact of the tainted input data. As described herein, it can be determined whether syntax of the mock executable statement has been manipulated by the tainted data.

Example mock executable statements in an SQL context can include the following:

```
SELECT id FROM dummy_table WHERE dummy_field = " OR 1=1;--'
SELECT id FROM dummy_table WHERE dummy_field = 'dummy'
```

Example 9—Example Syntax Manipulation and Indication of Same

In any of the examples herein, a tainting engine can be used in combination with a syntax attack detection template to detect both malicious input and malformed input. Although different levels of warning can be provided, both can be beneficial from a threat intelligence or computer network security perspective.

In practice, non-malicious input is the ordinary, typical input provided by users. Although such data is called "tainted" because it originates from the client, it is not malicious and is typically simply executed as is. In the case of a mock executable statement formed from a template as described herein, it need not be executed. The following tainted data is an example:

Username: john Password: letmein!

A resulting executable SQL statement generated from a template could be as follows:

```
SELECT * FROM USERS
    WHERE 'username' = 'john' AND 'password' = 'letmein!'
```

The query is not malicious and does not contain malformed input.

Of interest to the technologies described herein is tainted data that results in syntax manipulation. Syntax manipulation can comprise alteration of syntax structure by the tainted data or introduction of syntax error by the tainted data.

Alteration of syntax structure of an executable statement by the tainted data can be achieved by including special characters, executable language keywords, or the like in the tainted data. Such a scenario is sometimes called "malicious input." For example, a quote mark followed by cleverly placed keywords can alter the syntax structure of the executable statement. The following tainted data is an example:

Username: john Password: 'OR 1=1;--

A resulting executable SQL statement could be as follows:

```
SELECT * FROM USERS
    WHERE 'username' = 'john' AND 'password' = '' OR 1=1
```

The syntax structure of the statement has been altered in that additional tokens are introduced (e.g., the keyword "OR", the operator "=", and the literal "1"). The parser output can be used in combination with the unit of tainted data to determine that the tainted data spans more than one block (token) of the parser output; it can also be determined that the tainted data spans a boundary between more than one token type (e.g., a keyword-literal boundary). It can also be determined that an additional keyword ("OR") is present. Any one of such conditions indicates alteration of the syntax structure of the statement.

Such a query can be successfully parsed, but as described herein, it is not executed (e.g., it is a mock executable statement). Tainted data that alters the syntax structure of the statement can be categorized as malicious input. Detecting such a case, even if blocked by the application, can still be quite beneficial. For example, immediate countermeasures can be taken as described herein.

Introduction of a syntax error by tainted data can be achieved by including special characters in the tainted data. Such a scenario is sometimes called "malformed input." For example, a quote mark or the like can introduce the syntax error. The following tainted data is an example:

Username: jo'hn Password: [none]

A resulting executable SQL statement could be as follows:

SELECT*FROM USERS WHERE 'username'='jo'hn' AND 'password'=' '

Such a query will not be successfully parsed and will trigger a syntax error by the parser. Although possibly an innocent error, detecting such a case can still be quite beneficial. For example, a malformed input can be the result of a threat actor trying to deliberately trigger a syntax error as a first step in probing a system. Such a moment is opportune to alert and possibly automatically stop the attacker in her tracks.

The alert arising from detection of either scenario can indicate which scenario is involved (e.g., malicious input, malformed input, etc.) so that appropriate further action can be taken as described herein.

Input that manipulates the syntax of an executable statement is typically not provided by users who are simply using the system; instead, such input is provided to exploit a vulnerability, probe for a possible vulnerability, or to engage in other threat actor activity. As described herein, input categorized as malicious can be assumed to be malicious, and appropriate countermeasures can be taken. Malformed input can also well be coming from a threat actor. Accordingly, appropriate countermeasures can also be taken. Having different levels of alert can provide a richer functionality when deciding which countermeasures to take (e.g., performing surveillance versus redirecting the session to a honeypot, or the like)

Although the above examples show SQL queries, other SQL statements can be used instead. Further, the described technologies can be directed to programming languages other than SQL. Any programming language that can have its syntax manipulated by tainted data can benefit from the technologies described herein.

Example 10—Example Countermeasures

In any of the examples herein, any number of countermeasures can be taken responsive to determining that syntax of the mock executable statement has been manipulated by tainted data (e.g., as indicated by an alert as described herein).

Such countermeasures can include blocking the attack by closing the user session or connection associated with the cloud application, closing a database connection associated with the cloud application, terminating the application, locking an account of a user that was used for sending an incoming request that provided the input from the client computer, or the like. The user account or IP address associated with the attempted attack can also be locked or blocked.

Still further countermeasures include throttling the network connection associated with the attempted attack, redirecting the session to a honeypot, or the like.

Other countermeasures can include collecting further information about the attempt and combining it into an alert that is sent to an incident response team. For example, the HTTP request that triggered the detection can be collected for threat hunting, deception, or the like. As described herein, a reverse proxy can be employed to collect additional details and determine what additional measures are to be taken. Details of the incoming request that provided the input data from the client computer can be assembled and set to an incident response destination (e.g., dashboard, email, text alert, or the like).

Example 11—Example Runtime Application Self Protection

In any of the examples herein, the application can exercise Runtime Application Self Protection. For example, the application can determine at runtime that an attempted attack is underway. It can be alerted and take countermeasures accordingly. As described herein, the application can be in communication with a reverse proxy to determine further details about the attempted attack.

Example 12—Example Instrumentation

In any of the examples herein, instrumentation can be used to achieve monitoring of tainted input data by a tainting engine. A variety of instrumentation techniques can be applied, including the ones described below with reference to an example tainting engine. For example, class substitution (e.g., replacing original classes with instrumented, taint-aware classes that invoke functionality of the original class) can be used to achieve non-intrusive substitution. Manual instrumentation can also be used.

Non-intrusive instrumentation has an advantage in that the original code need not be changed to take advantage of the technologies described herein. Instead, any cloud application, whether vulnerable or not, can be easily instrumented so that tainted input data can be determined and used in conjunction with the template described herein to detect attempted attacks, leading to enhanced threat intelligence and computer network security.

Figure 3:
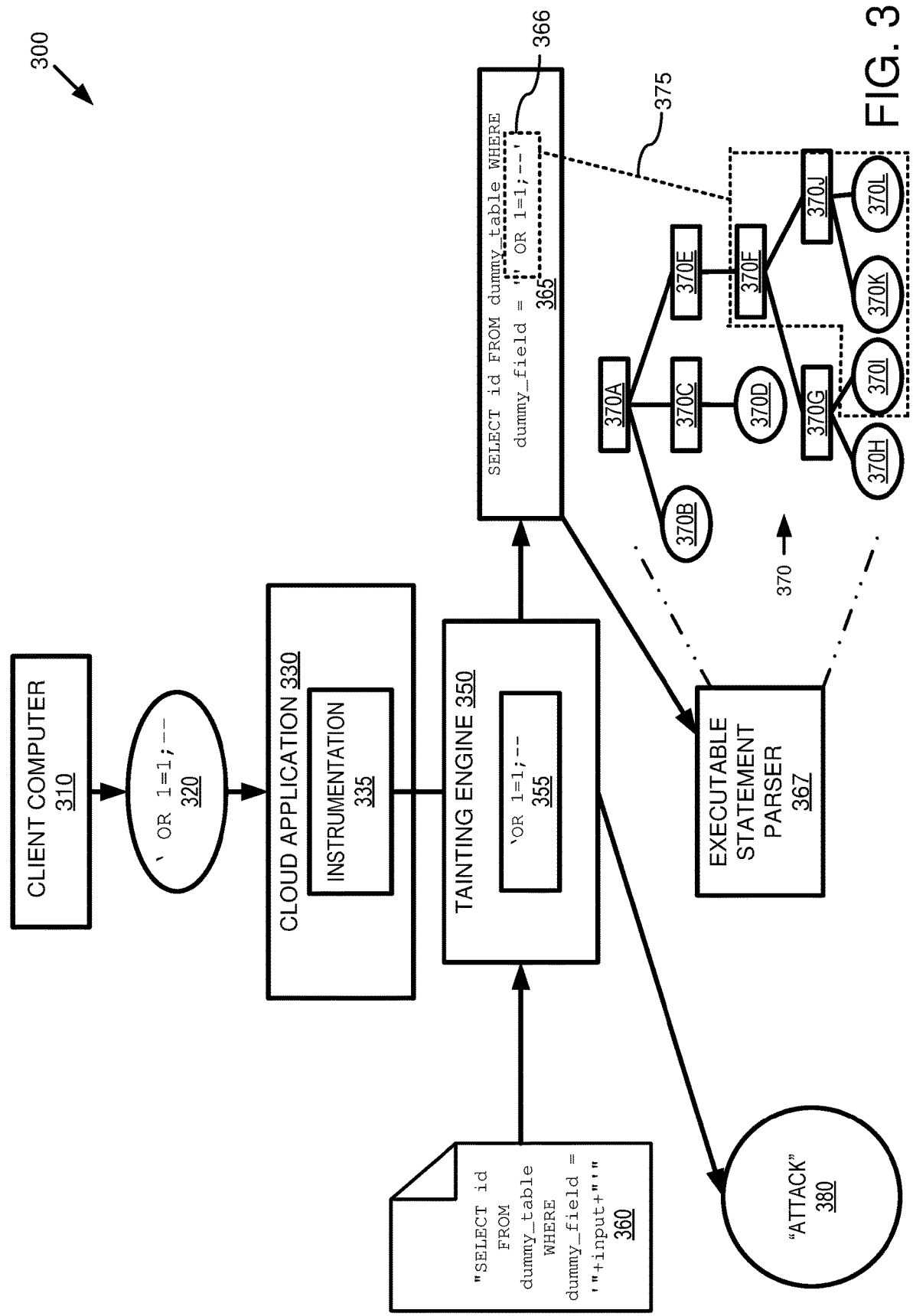
FIG. 3 is a block diagram of example system implementing an injection attack sensor with a syntax attack detection template via an executable statement parser.

Example 13—Example System Implementing an Injection Attack Sensor with a Syntax Attack Detection Template Via Executable Statement Parser FIG. 3 is a block diagram of an example system 300 implementing a tainting engine 350 in conjunction with a syntax attack detection template 360 via an executable statement parser 367. In the example, input data 320 is collected from a client computer 310 by a cloud application 330.

Instrumentation 335 within the cloud application 330 allows a tainting engine 350 to track the input data 355 that originated from the client computer and appears in an executable statement constructed by the cloud application 330 (so called "tainted" data). Such data can be identified as separate units of tainted data (e.g., input parameters provided by the client computer 310).

The tainting engine 350 is configured to access the syntax attack detection template 360 and incorporate a given unit of tainted data 355 into the template 360, resulting in a mock executable statement 365.

An executable statement parser 367 is configured to parse the mock executable statement 365 according to the syntax of the programming language of the template 360 (e.g., SQL or the like). The resulting parsed representation 370 of the mock executable statement 365 can be analyzed in conjunction with correlation between the representation 370 and the tainted input data 366 as it appears in the statement 365.

In the example, the representation 370 takes the form of a tree showing tokens 370A-L (e.g., keywords, operators, literals, and the like) that could be further processed if the statement 365 were to be actually executed (e.g., via optimization, execution, or the like).

Instead of actually executing the mock executable statement 365, an analysis can be done to determine whether the tainted input data spans more than one token, whether it spans a token type boundary, whether it spans a literal-non-literal boundary, or the like. In the example, the tainted input data indeed spans a number of tokens 370F, 370I, 370J, 370K, and 370L; it also spans a token type boundary (e.g., literal, operator, keyword); it also spans a literal-non-literal boundary.

Thus, it is determined that the tainted input data is manipulating the syntax of the mock executable statement, and an appropriate alert (e.g., of type "malicious") can be generated, and further action taken as described herein.

Alternatively, parsing of the mock executable statement 365 can fail (e.g., the parser returns a result of "fail" or "parse error"). In such a case, it can still be determined that the tainted input data is manipulating the syntax of the mock executable statement 365 (e.g., given that the syntax of the template 360 is known to be correct). In such a case, an appropriate alert (e.g., of type "malformed") can be generated, and further action taken as described herein.

Alternate ways of determining whether the tainted input data is manipulating the syntax can be employed. For example, if the number of tokens changes from a known number of expected tokens, manipulation can be indicated (e.g., "malicious").

As described herein, the cloud application 330 may execute its own executable statement and may indeed avoid the attempted attack. However, it is still beneficial to know that an attack was attempted, even if the cloud application 330 is not vulnerable to the attack.

Figure 4:
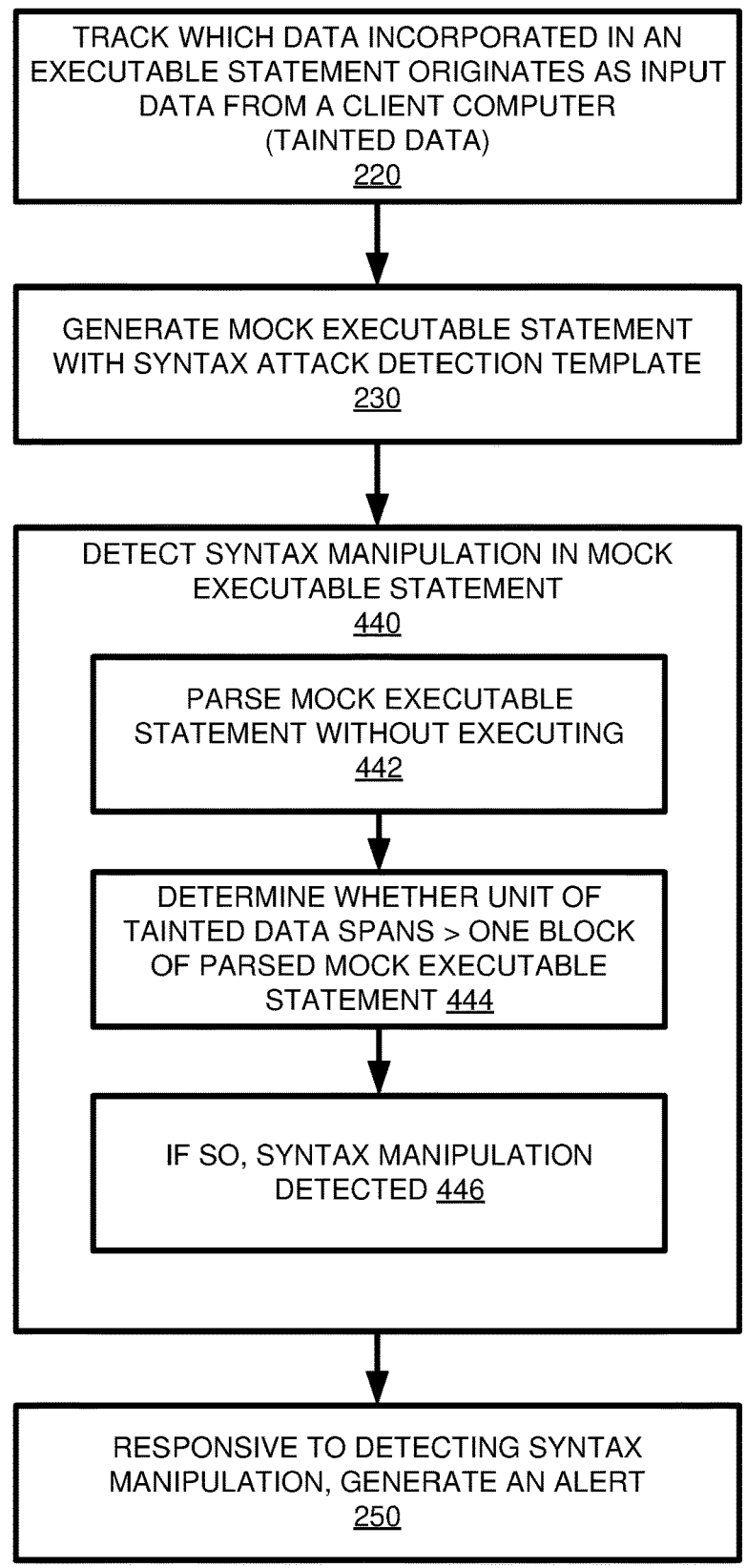
FIG. 4 is a flowchart of an example method of sensing an injection attack with a syntax attack detection template via parsing a mock executable statement.

Example 14—Example Method of Sensing an Injection Attack with a Syntax Attack Detection Template Via Parsing a Mock Executable Statement FIG. 4 is a flowchart of an example method 400 of sensing an injection attack with a syntax attack detection template via parsing a mock executable statement and can be implemented in any of the examples herein (e.g., the systems shown in FIG. 1 and FIG. 3). The acts 220, 230, and 250 can be as described with reference to FIG. 2.

The act 440 can be an enhanced version of act 240 shown in FIG. 2 that detects syntax manipulation in the mock executable statement. As described herein, such processing can be performed by an enhanced tainting engine that works in conjunction with the template.

Specifically, at 442, the mock executable statement can be parsed without executing it. Parsing can generate an internal representation of the executable statement in token form (e.g., a tree, a list of string ranges associated with respective tokens, or the like).

At 444, it can be determined whether a unit of tainted data spans more than one block of the parsed mock executable statement (e.g., it is incorporated into more than one token).

At 446, responsive to determining that a unit of tainted data does span more than one block, syntax manipulation (e.g., "malicious") is detected.

Alternatively, a parsing error can also indicate syntax manipulation (e.g., "malformed") as described herein.

Figure 5:
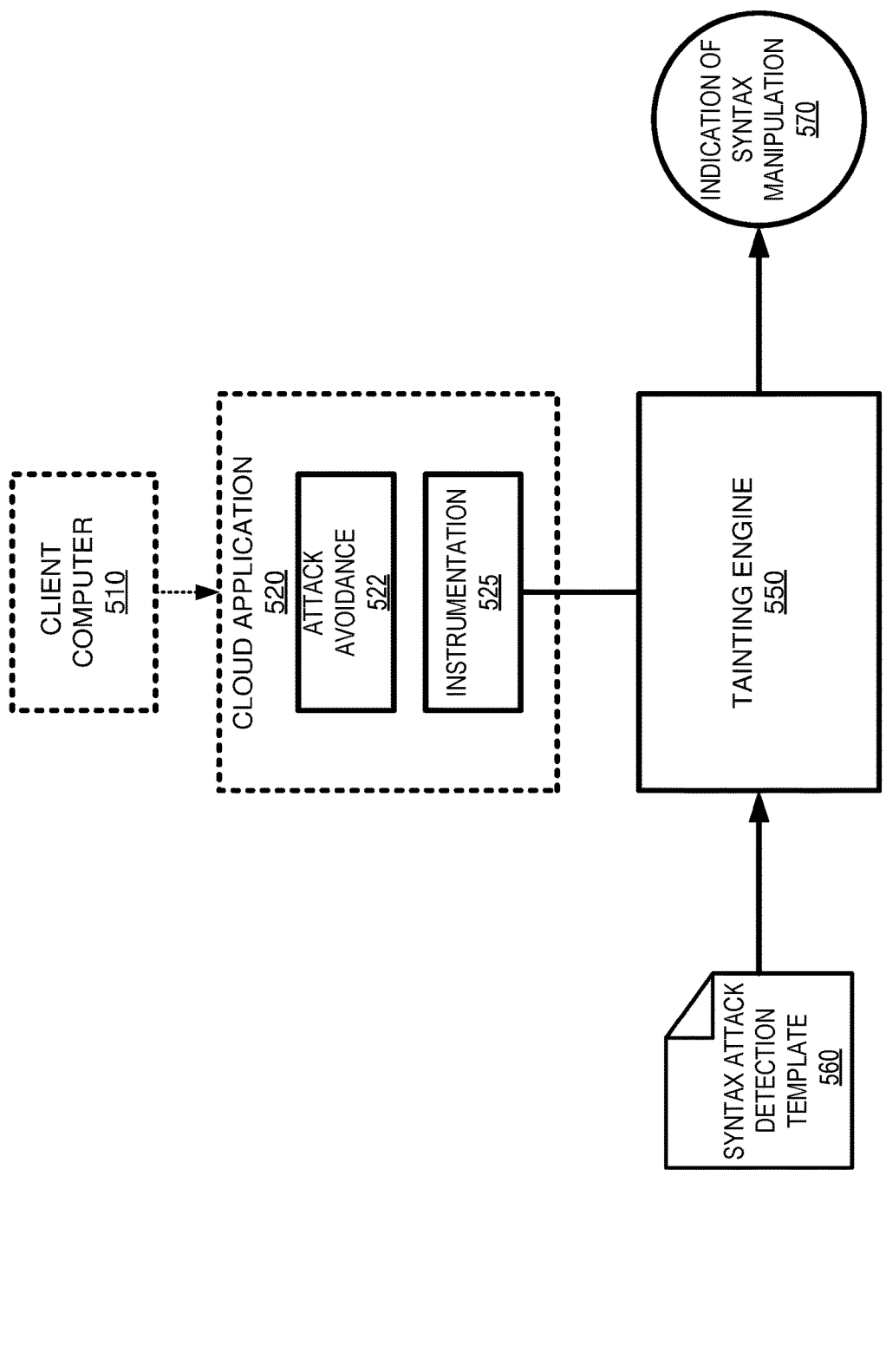
FIG. 5 is a block diagram of an example system that detects an attack, even if the application is not vulnerable to the attack.

Example 15—Example System Detecting Attack in Non-Vulnerable Application Scenario FIG. 5 is a block diagram of an example system 500 that detects an attack, even if the application 520 is not vulnerable to the attack. In the example, the application 520 is in communication with a client computer 510 (e.g., from which tainted input data is received). The application 520 comprises its own attack avoidance logic 522 and is instrumented with instrumentation 525 as described herein.

The tainting engine 550 tracks tainted input data that is incorporated into an executable statement by the application 520. The tainting engine 550 is enhanced to input the tainted input data into the syntax attack detection template 560 (e.g., to generate a mock executable statement) and detect whether the tainted input data manipulates the syntax of the generated mock executable statement.

If so, an indication 570 of syntax manipulation (e.g., an alert) is generated and sent accordingly.

In practice, tainting engine functionality may be shared by the attack avoidance logic 522 and functionality employing the syntax attack detection template.

As described herein, even if the application 520 has its own attack avoidance logic 522 and successfully avoids the attack, it can be beneficial to detect the attempted attack as described herein with the template 560.

Example 16—Example Tainting Engine

The following describes a tainting engine implemented in a Java context. The tainting engine can intercept SQL operations, detect whether the operation would lead to an injection attack, and send an error if so and prevent the operation.

The technologies described herein can detect injection attacks even when the underlying application is properly coded to avoid them. They can also retrieve the HTTP request that triggered the detection for further countermeasures.

In a typical use case, a threat actor is leveraging a web form, such as a login page. As the threat actor wishes to bypass authentication, SQL injection can be attempted. Without the technologies described herein, two possible scenarios emerge:

(1) The injection succeeds, letting the threat actor connect as a legitimate user and steal data while probably remaining undetected because no alert is triggered or (2) The injection fails, letting the threat actor try something else such as finding another form field to tamper with, until eventual success.

The tainting engine described below can prevent successful injections and block them before execution, protecting the data. However, the threat actor can remain undetected and free to discover and exploit a vulnerability not protected by the invention (e.g., a local file inclusion (LFI) attack).

Web application firewalls are likely to detect injections and will generate alerts; however, such tools are prone to false positive and false negative detections. Because of the high number of false positives, automatic response such as banning the traffic from the originating IP address is not a practical option because it could impact the quality of service for non-malicious users.

One can take the high-fidelity detection of the tainting engine and modify it to alert on detected attack attempts and make automatic response a valid strategy. As there is interest in detecting attackers even before they succeed, the tainting engine can be enhanced to detect attacks aimed at non-vulnerable applications (e.g., SQL queries implemented via prepared statements) so that via automated response, subsequent attacks can be prevented as well (e.g., LFI exploitation).

Thus, the modified tainting engine can detect any injection, including those that could not succeed because the application is not vulnerable. Instead of simply blocking the attack, the HTTP request can be retrieved and used for countermeasures (e.g., to block-list the associated IP address for a time period, re-route the session to a honeypot instead of the real application-letting the threat actor waste resources hacking a decoy system and preventing potential harm).

Example 17—Example Architecture

Figure 6:
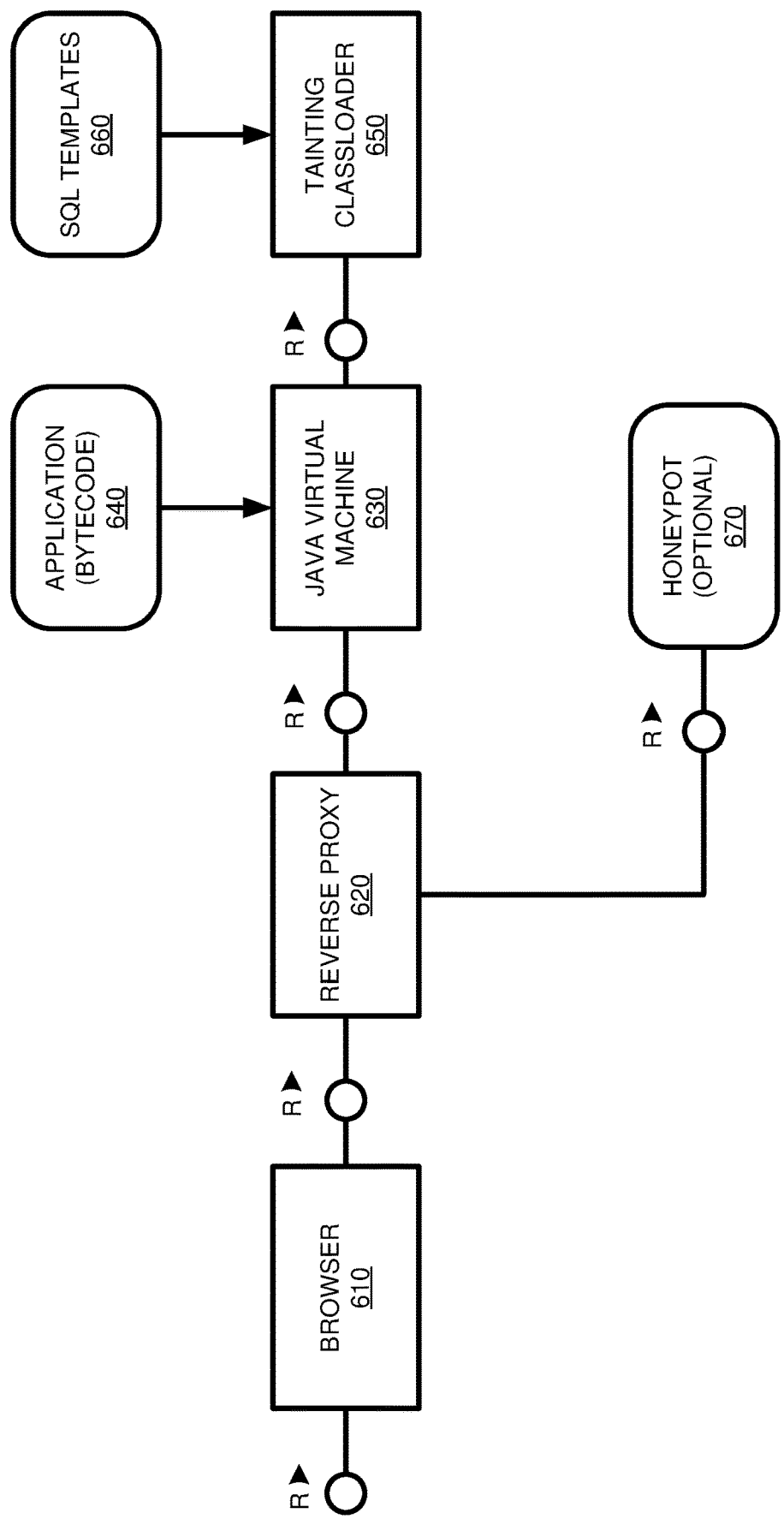
FIG. 6 is a block diagram of an example software architecture for implementing the technologies described herein.

FIG. 6 is a block diagram of an example software architecture for implementing the technologies described herein. In the example, a browser 610 is in communication with a Java Virtual Machine 630 that is executing the bytecode 640 of an application. A reverse proxy 620 can be interposed in the session so that it can collect information, direct to the honeypot 670, or otherwise intercept or redirect the session. A tainting classloader 650 can implement a tainting engine, and any of the SQL templates 660 can serve as the syntax attack detection template described herein.

The application bytecode 640 is instrumented by attaching a tainting classloader 650 in charge of overloading certain methods such as setString( ). The classloader is used to retrieve a copy of the SQL query and of its parameters and can test whether executing the query with the submitted parameters would alter the intrinsic logic (e.g., syntax) of the query. If yes, the query execution is interrupted.

The basic cases of non-malicious input, malicious input, and malformed input are described herein.

The classloader 650 can be enhanced as described herein so that on top of blocking the execution, it sends back a response. A reverse proxy 620 in front of the application can serve the role of capturing the HTTP response sent via the classloader 650.

The response can contain the following: A copy of the HTTP request which led to the (blocked) execution of the SQL query and a status code detailing whether the query was blocked because the request resulted in a parsing error ("malformed") or was malicious ("malicious").

The proxy can then generate an alert with the proper context as details (e.g., source IP address, user agent of the browser, session cookies, and the like), permitting an incident response team to investigate. The user agent and cookies can be further used to retrieve the threat actor's logged history and accelerate identifying potential damage.

The proxy can also perform an automatic response, including any of the countermeasures described herein, such as: replaying the user's request against a honeypot and sending back the response (the threat actor will not notice that the request was not sent to the original application); locking the account of the user that was used to send the request; sending a generic response back such as service unavailable (503) or ok (200), or the like.

The proxy can decide which action to perform based on the status code. Malicious requests can be considered malicious. Requests of type error (malformed) can be treated by sending a generic error message or by pretending that the request completed normally. There could be a high chance that the malformed requests are due to an attack attempt, such as by bypassing character encoding with an interception proxy, but poorly implemented applications may simply not have implemented character encoding, in which case the error will simply be due to poor design and not necessarily due to an attack. Thus, the automatic response from the proxy may be different for a malformed request versus a malicious request.

Example 18—Non-Vulnerable Applications

Another enhancement is detection if there is an attempted attack even if the application is not vulnerable. The attack will not be successful, but knowing there was an attempted attack can allow the proxy to perform an automatic response, preventing a possible next attack from succeeding.

To detect the attack, a vulnerable SQL statement can be used against which the received request will be tried. With vulnerable applications, one can extract the SQL query and run the request against it before actually performing the call on the database. However, applications where SQL queries are created via prepared statements are not vulnerable.

So, to detect an attack, such an SQL query is not used. Instead, a syntax attack detection template can be used as described herein.

Considering the following code snippet for a login page, one can assume that the entered values for the login and password fields are stored respectively in the 'user' and 'pwd' variables.

The application code is properly written and uses prepared statements for its SQL queries:

```
PreparedStatement pstmt =
con.prepareStatement("SELECT id FROM users
    WHERE username = ? AND password = ?");
    pstmt.setString(1, user);
    pstmt.setString(2, pwd);
```

A non-secure version of the query would be as follows:

```
SELECT id FROM users WHERE username = "'+user+'"
    AND password = ' "+pwd+"'
```

The threat actor, not knowing whether the application is vulnerable or not, may try to inject the following payload to bypass authentication:

In the 'user' field, payload: ' OR 1=1;--

In the 'pwd' field, payload: dummy

In the non-vulnerable application, the 'user' value will be properly escaped, and the resulting query will be as follows:

```
SELECT id FROM users
    WHERE username = '\' OR 1=1;--' AND password =
'dummy'
```

Since the user \' OR 1=1;-- does not exist, the injection will not happen, but it will not be detected, either.

As described herein, a preconfigured SQL template such as the following can be used:

```
SELECT id FROM dummy_table WHERE dummy_field =
    "'+input+'"
```

Before calling the prepared statement, input parameters can be tested against a selected preconfigured SQL template. With the above example, the following queries will be constructed:

```
SELECT id FROM dummy_table WHERE dummy_field = '' OR
1=1;--'
SELECT id FROM dummy_table WHERE dummy_field =
'dummy'
```

By analyzing the first query with a tainting engine, it is realized that the first input generated at least one too many keywords, meaning that it was an injection attempt, and the response mechanism is triggered.

The second query does not lead to any specific response in the example.

Thus, a predefined SQL template can be an effective way to detect an injection because it allows for SQL query parsing and the actual SQL query to be executed by the application and does not impact detection.

Most queries can be captured with the following template:

```
SELECT id FROM dummy_table WHERE dummy_field =
    "'+input+'"
```

SQL supports a set of input types from Strings (VARCHAR) to Integers (INT), to Booleans (BOOL), to Dates (TIMESTAMP) etc. However, when it comes to query constructions, user input can be considered to be a String before being passed to the function that will parse the query.

The SELECT template can be used. Extra templates can be used to cover additional cases, depending on the structure of the original query. For example, the following can be used if the query in the prepared statement uses the keyword LIKE instead of the keyword (operator)=:

```
SELECT id FROM dummy_table WHERE dummy_field LIKE
    "'+input+'"
```

This is just an example as both detect attacks.

Example 19—Example XSS Attacks

The technologies can be applied to cross-site scripting (XSS) attack scenarios. Such types of attacks can depend on the programming language of the application. In an HTML context, various approaches can be used. An example syntax attack detection template in the HTML context can take the following form:

$$\langle div \rangle + \text{input} + \langle /div \rangle$$

The expected output is that the template can be parsed properly (e.g., with a Java HTML parser such as jsoup) and return the number of descendants or a parsing error.

Example expected form, no attack (returns 1):

$$\langle div \rangle John \langle /div \rangle$$

Example malformed input (returns 'parsing error'):

$$\langle div \rangle Jo \langle hn \langle /div \rangle$$

Example malicious input with too many descendants (returns 2):

$$\langle div \rangle \langle script \rangle alert(1) \langle /script \rangle \langle /div \rangle$$

Other variants are possible.

Example 20—Example Tainting Engine Implementation

A dynamic dataflow tracking mechanism can be realized with a tainting framework that includes three functional elements. The first element could be a mechanism to mark or identify sources and security sensitive consumers of potentially insecure data. Such data is tainted, e.g., corresponding tainting information (metadata) is assigned to flag the potential risk. For example, sources of potentially insecure data can be applications where users may input or otherwise inject malicious data to be processed at a server. Security sensitive consumers are usually called sinks and may represent, for example, applications or systems storing sensitive information (e.g., personal data).

Another element of the tainting framework may be described as a mitigation policy that is applied when tainted data arrives at a sink. There are various scenarios or approaches for such mitigation or reaction on the receiving of tainted data, e.g., depending on the type of the sinks. In most cases, the receiving or consuming applications are warned by the assigned metadata (the tainting), and trigger algorithms to further analyze the received data, or relevant parts of it, before and/or during and/or after it is processed.

Figure 7:
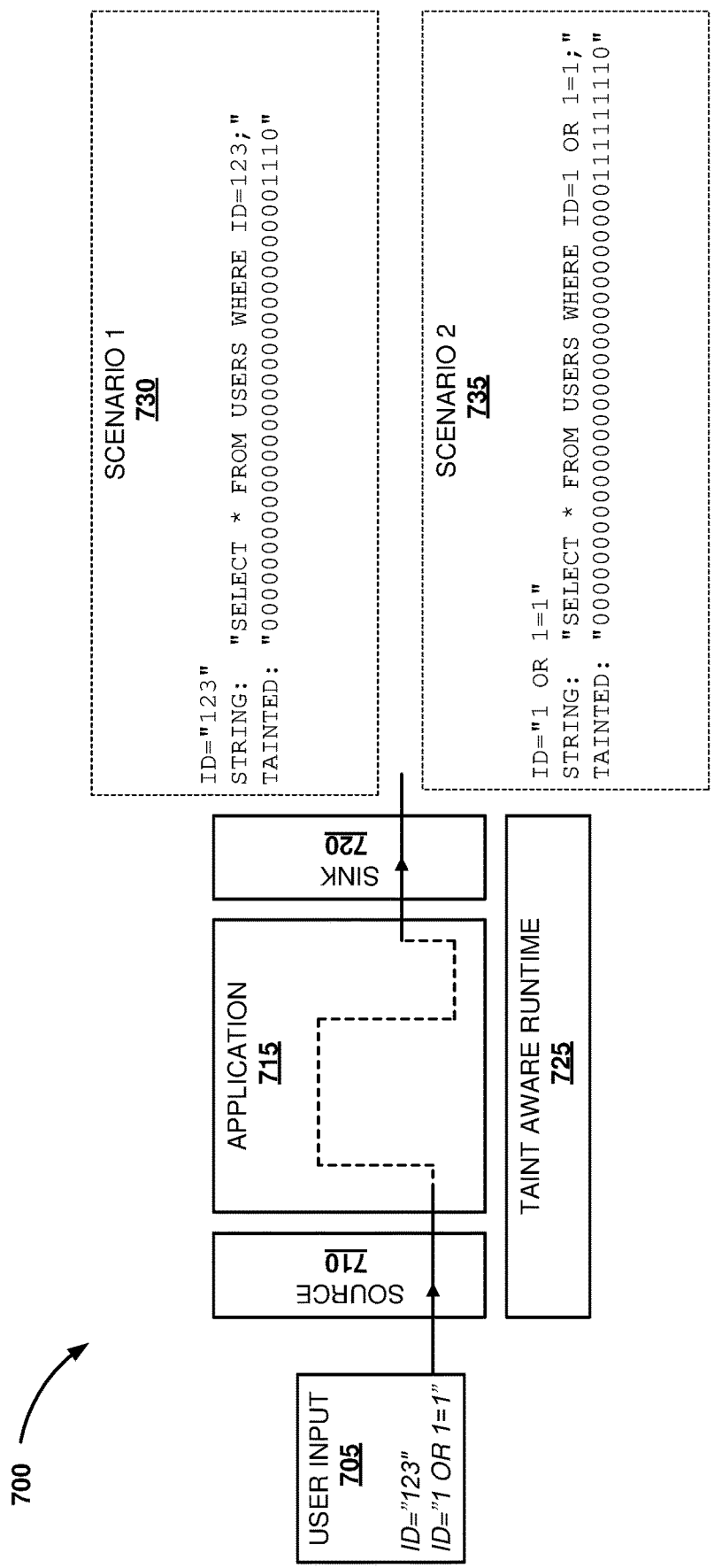
FIG. 7 is a block diagram illustrating a computing environment where tainting framework is implemented, according to one embodiment.

Focus can be on the third functional element that the typical tainting frameworks include, namely, a mechanism to track tainted dataflows from sources to sinks. FIG. 7 illustrates computing environment 700 that implements tainting, according to one embodiment. As shown in the figure, user input 705 is provided and passed to a taint-aware runtime 725 via source 710, to be processed at sink 720.

Potentially damaging user inputs can be provided as strings. Furthermore, HTTP (Hypertext Transfer Protocol) is a text-based protocol, hence the focus on Strings. The string-based code injections includes a broad scope of vulnerabilities, such as SQL injections, XSS, remote command injections, JavaScript object notation (JSON) injections, single mail transfer protocol (SMTP) injections, etc. Such vulnerabilities may be exploited by an attacker controlling the source (e.g., 710 via 705). As a result, potentially damaging or exposing string flows may be processed at a security sensitive sink (e.g., 720). Harmful strings may be placed in input fields and forms, uniform resource locators (URLs), etc.).

A framework focused on tainting string flows may provide a high level of protection and accuracy, minimizing the overhead. Therefore, without limiting only to string data, the description below often refers to taint tracking of strings, e.g., character sequences. For example, user input 705 may be a sequence of characters representing user identification (ID). This sequence of characters can be passed from source 710 to sink 720 via application 715 using a string class.

In one embodiment, the character string provided at user input 705 is marked or tainted, e.g., at source 710. The tainted string is tracked at application 715 and passed to sink 720 together with the assigned tainting information. Based on the tainting metadata, sink 720 may handle the string in a way that would avoid or mitigate any potential security or functional issue. Accordingly, the tainting framework of FIG. 7 provides reliable and efficient receiving, tracking and passing of tainting information together with the respective dataflows by applications (e.g., 715) during their execution (e.g., at runtime 725).

FIG. 7 is supplemented with two example listings representing scenario 1 (730) and scenario 2 (735) to illustrate the tainting of potentially harmful strings passed from source 710 to sink 720 via application 715. For example, when an existing ID is entered, e.g., in a web application field, corresponding user data can be accessed. Respectively, the entry may be used to form a SQL statement (e.g., at 710) and passed to application 715 as a string. Additionally, taint information may be assigned in the form of a string with the same length as the SQL statement, where one type of characters (e.g., "0") positionally correspond to the secure parts of the SQL statement, whereas another type of characters (e.g., "1") positionally correspond to the potentially damaging parts (e.g., the user entry).

Scenario 1 (730) shows that "123" is received as ID input. The SQL statement formed as a result is "SELECT*FROM users WHERE id=123;", and the assigned tainting metadata is the string "0000000000000000000000000000001110". As illustrated, the three characters "1" positionally correspond to the ID "123".

In scenario 2 (735) the ID that is entered is "1 OR 1=1". Respectively, the SQL statement formed based on the entry is "SELECT*FROM users WHERE id=1 OR 1=1;". The assigned tainting string is "00000000000000000000000000000111111110". The SQL statement of scenario 2 (135) is potentially harmful as the "WHERE" clause is always true. Thus, the whole table "users" will be selected. The tainting information, when tracked by one or more applications (e.g. 715 executed in taint-aware runtime 725) and passed to sink 720, may be used to prevent the execution of the SQL, e.g., by pre-processing the marked part of the SQL statement.

In one embodiment, a taint-aware data class is defined to enable the tracking of tainted dataflows. A taint-aware class may contain a field (e.g., a payload field to store an underlying object or instance of the original data class), and a separate field (e.g., a tainting or metadata field) to store taint information assigned to the object of the original data class. The tainting field of the taint-aware data class could be accessed and manipulated by public methods. The taint-aware data class could implement the methods of the underlying original data class. Thus, a method implemented by the taint-aware class may first store and/or propagate taint information, and then call a corresponding method of the underlying original data class, e.g., acting as a proxy or a wrapper, shadowing the original data class.

This description includes examples, terms and references pertinent to Java technology, however, one skilled in the art would recognize that similar techniques could apply to other, e.g., non-Java environments and embodiments.

Table 1 lists code snippets illustrating a taint-aware Java class "TString" shadowing the original "String" Java class. In the provided example, the tainting information is represented by a simple Boolean flag to mark a string as either tainted or not. Other implementations may be possible, e.g., that allow tracking more detailed tainting information, such as the character-based or range-based. For example, the tainting mode illustrated in scenario 1 (730) and scenario 2 (735) of FIG. 7 can be achieved in a similar way. In this mode, different ranges of the string to be tainted may be flagged differently instead of limiting the tainting to a single flag. In one embodiment, the mode of tainting may determine the data type of the field added to the taint-aware class to store the tainting metadata. Furthermore, in one embodiment, the tainting mode could be configurable.

TABLE 1

```
1   public class TString {
2       // Field to store the underlying String data
3       private String str;              // wrapped String object
4       // Field storing taint information
5       private boolean tainted;         // can be more complex
6
7       // Example constructor with default values
8       public TString( ) {
9           this.str = "";
10          this.tainted = false;
11      }
```

TABLE 1-continued

```
12
13      // Constructor which also sets the taint information
14      public TString(String s, boolean tainted) {
15          this.str = s;
16          this.tainted = tainted;
17      }
18
19      // Taint getter
20      public boolean isTainted( ) {
21          return this.tainted;
22      }
23
24      // Taint setter
25      public void setTaint(boolean b) {
26          this.tainted = b;
27      }
28
29      // Example constructor implementing a String constructor and
30  creating a new
31      // underlying String
32      public TString(char value[ ]) {
33          this.str = new String(value);
34      }
35
36      // ... other String constructors
37
38      public TString replace(char oldChar, char newChar) {
39          // Call the underlying String method and propagate taint
40          information return new TString(this.str.replace(oldChar,
41  newChar), this.tainted);
42      }
43
44      public TString replaceAll(TString regex, TString replacement) {
45          boolean taint = this.tainted;
46          Pattern p = Pattern.compile(regex.str);
47          Matcher m = p.matcher(this.str);
48          if (m.find( )) {
49              // Propagate taint information if necessary
50              taint |= replacement.tainted;
51          }
52          // Call and return the underlying String method
53          return new TString(this.str.replaceAll(regex.str,
54  replacement.str),
55              taint);
56      }
        // ... other String methods
    }
```

For example, the TString class defines public methods that could be called during runtime to set tainting (e.g., setTaint) and check whether a string is tainted (e.g., isTainted). For example, a source application may assign tainting to user inputs, and a sink application may check the tainting and take action based on it (e.g., reporting, analyzing, blocking, etc.). Other public methods may be defined as shells for the corresponding public methods of the underlying original data class (String). As shown in Table 1, such a method is "replace" that is defined as TString method to call the original String "replace" method and to propagate taint information.

The approach of wrapping the original data class (e.g., String) instead of instrumenting it directly to enable the taint-tracking (e.g., adding a field for tainting metadata) is agnostic to the implementation of the underlying original methods. The runtime, e.g., the Java Virtual Machine (JVM) may execute class (String) methods in interpreted mode, e.g., as defined in class files. Another mode is Just-in-time (JIT) compilation mode. In JIT mode, additional optimizations can occur when the Java standard library class methods are no longer executed, but instead are replaced with pre-compiled function calls known as intrinsics (natively implemented or built-in methods). If the bytecode of the original classes is instrumented directly (Java Standard Library) and the JVM switches to calling intrinsic methods (e.g., for better performance), the instrumented class methods will not be executed, and the tainting information would be lost. In one embodiment, taint information is seemingly propagated by the taint-aware wrapper class (e.g., TString), regardless the mode of execution of the methods of the underlying data class (e.g., String).

Taint-aware classes may be defined also for string-like Java classes, e.g., StringBuffer and StringBuilder, as well as for auxiliary classes, e.g., Formatter. Thus, the public methods that relate to string data are proxied to ensure the tracking of the taint information. In one embodiment, the instances of String and String-like classes in an application where taint tracking is desirable are replaced with corresponding instances of the defined corresponding taint-aware wrapper classes (e.g., TString, TStringBuffer, TStringBuilder, etc.).

Figure 8:
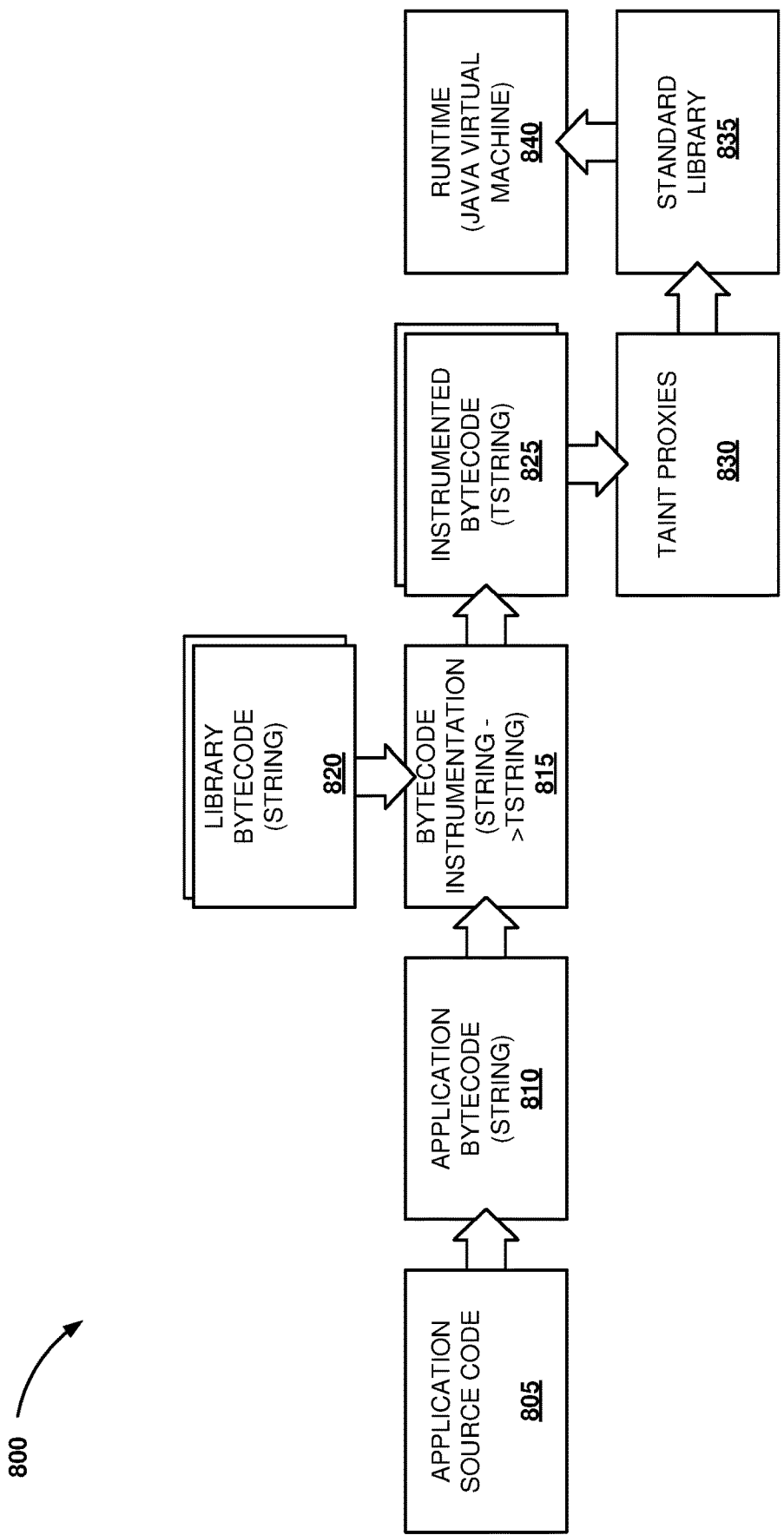
FIG. 8 is a block diagram illustrating a computer system, enabling the replacement of an original data class with a taint-aware class, according to one embodiment.

FIG. 8 illustrates system 800 enabling the replacement of an original data class with a taint-aware class in an application, according to one embodiment. Application source code 805 could be compiled to application bytecode 810, e.g., in the usual manner. For example, that means the String class instances are not affected during the compilation to bytecode. Further, at module 815, the instances of the original data class or classes (e.g., String, StringBuffer, StringBuilder) in application bytecode 810 are replaced with corresponding instances of taint-aware class or classes (e.g., TString, TStringBuffer, TStringBuilder). The definitions of the taint-aware class/es, including their structure and methods are provided, e.g., as bytecode libraries. For example, the definitions of TString and the string-like classes are provided in library bytecode 820.

The bytecode instrumented with the taint-aware class/es instances (825) is uploaded and executed, e.g., at runtime 840. In one embodiment, taint-aware class (e.g., TString) methods propagate tainting information and call the corresponding underlying original data class (e.g., String) methods. In other words, taint proxies 830 (e.g., TString methods) shadow Standard Library 835 (String methods) providing taint tracking without altering either the Standard Library code and/or definitions (835) or the runtime (840) itself (e.g., when the runtime executes intrinsics superseding the methods in the standard libraries).

Figure 9:
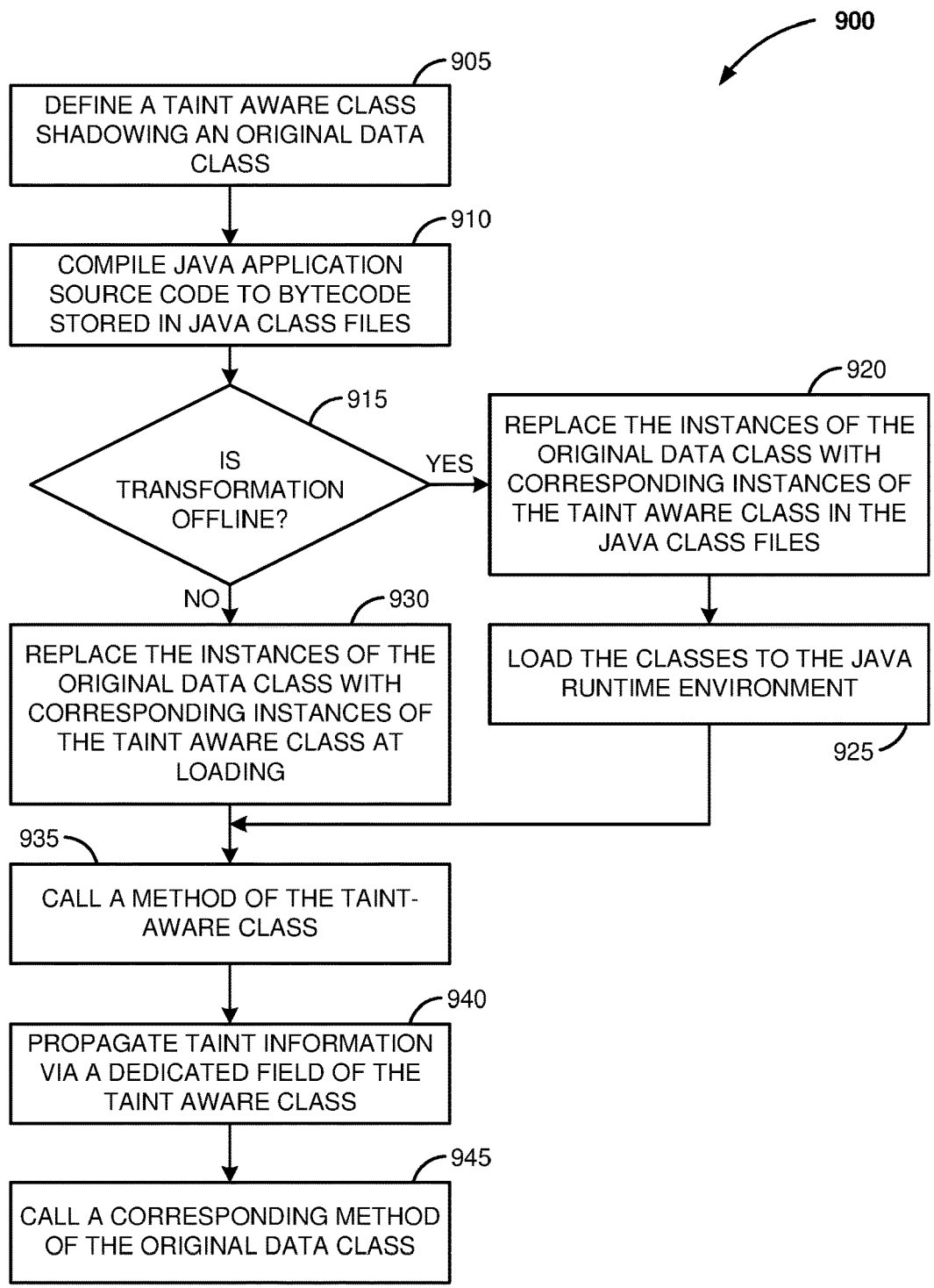
FIG. 9 is a flow diagram that illustrates a process to track tainting, according to one embodiment.

Process 900 shown in FIG. 9 illustrates at least some of the activities involved in taint-tracking via non-intrusive Java bytecode instrumentation, according to one embodiment. At 905, a taint-aware class is defined to schedule an original data class. For example, TString is defined to schedule String Java class. TString includes an additional field for tracking tainting information. Further, TString includes methods that propagate taint information and refer to corresponding methods of String (see Table 1).

At 910, an application is compiled to bytecode as usual. After that, the instances of the original data class are replaced with corresponding instances of the taint-aware data class. The transformation that results in injecting the defined taint-aware class/es to replace the underlying original data class/es can be performed at two separate points in the application's lifecycle. At 915, it is checked or decided whether the transformation should be executed offline. In one embodiment, the decision whether to execute the transformation offline may be pre-configured, e.g., by a user as a configuration option. When executed offline, application class file/s and their dependencies are transformed in a separate step before execution. Thus, at 920, the instances of the original data class/es are replaced with corresponding instances of the taint-aware class/es (e.g., in the ".class"

and/or ".jar" Java class files). The transformed application and dependencies are loaded to the runtime in the usual way, at 925.

When the transformation is online instead of offline, the instances of the original data class/es are replaced with the instances of the taint-aware class/es as they are loaded, at 930. For example, JVM implementations provide a functionality called Java agents. Through this functionality, it is possible to register agents that can interact with the class loading mechanism. For example, it is possible to transform Java bytecode while a class is being loaded. Thus, classes can be dynamically instrumented "on-the-fly" at loading, as the JVM starts using them. This will make the transformation easier and more reliable, e.g., when an application involves multiple resources which may be dynamically loaded.

In one embodiment, a Java agent may be configured at the JVM to handle the transformation dynamically. In this mode, a separate transformation or build step may not be necessary. The JVM may be started with additional arguments or configuration to enable the Java agent to transform the application with taint-awareness at loading (e.g., "-javaagent:taintingtransformation.jar"). The online transformation mode, however, may impact the performance on application startup as the class instances of the standard class/es are automatically replaced with the corresponding instances of the taint-aware class/es.

Typically, the functionality of a Java application is provided via more than a single ".jar" file. For example, a complex Java application may reside in several application containers which allow loading of functionality at run-time. Additionally, Java applications can dynamically load new code from the network during execution. Therefore, a purely offline instrumentation may not be feasible for all use cases. Accordingly, the online mode or a combination between offline and online modes would be advantageous.

Once the application is loaded, at 935, a method that refers to an instance of the taint-aware data class is called, e.g., during the execution of the application. The method of the taint-aware data class could be called instead of a method of the original data class due to the instrumentation. The call of such a wrapper method proxies the call to the original method to manage taint information, e.g., via a dedicated field of the taint-aware class, at 340. Further, the proxy method calls the original method, e.g., the corresponding method of the original data class, at 945, to perform the intended operation on the data of the instance of the taint-aware data class (the dataflow). Accordingly, the standard methods functionality is not affected. However, functionality is added to the taint-aware proxy methods to handle the tainting information as appropriate or in accordance with the operation the original method performs on the data to which the tainting is assigned (e.g., on the string passed from a source to a sink).

FIG. 10 shows example snippets of Java source code 1005 compiled to bytecode 1010, and further instrumented to replace String class instances with TString class instances 1015. In an embodiment, Java Standard Library classes are not instrumented. Instead, the calls to Java Standard Library class methods which accept String arguments are proxied. If a method manipulates a String class, a wrapper method is inserted to correctly propagate the taint information. Otherwise, the underlying String is simply passed on to the Standard Library method.

Reflection in Java allows code execution based on values which are only known at run-time. For example, instances of classes can be loaded by reflection using the "Class.forName( )" method, as shown in FIG. 10, 1020. To address this, calls to the "Class.forName( )" method are overwritten so that the corresponding taint-aware class is returned if applicable. For example, in 1020, the taint-aware Class.forName( ) method will recognize that "java.lang.String" is to be transformed to TString, and will return the corresponding TString class.

Taint-tracking by manipulating bytecode, e.g., of Java applications, ensures portability in that the resulting manipulated bytecode can be executed on any runtime (Java Virtual Machine) implementation. This is advantageous over solutions that implement taint-tracking by instrumenting the runtime (e.g., JVM). Since just bytecode is affected, no source code access or modification may be required for implementing taint tracking in an application. Accordingly, this approach is appliable also to third-party libraries and/or applications for which source code is not always available.

As mentioned, solutions that rely on bytecode manipulation also suffer in the cases where native and intrinsic functions are called within the runtime (e.g., JVM). For example, to improve performance, a JVM can compile Java bytecode into machine code to improve performance (JIT compilation) or in some cases replace Java methods with pre-compiled native implementations (intrinsics). Thus, methods of the data classes for which bytecode is instrumented may not be called, replaced by such intrinsics. Accordingly, such taint tracking solution will not be portable without manipulating the JVM itself. In addition, existing tainting solutions which employ bytecode manipulation attempt to offer a complete framework to track every data type, leading to serious performance penalties. By focusing on one data type, and more specifically, on String and String-like classes, the performance overhead is limited while handling the most relevant security vulnerabilities.

Figure 11:
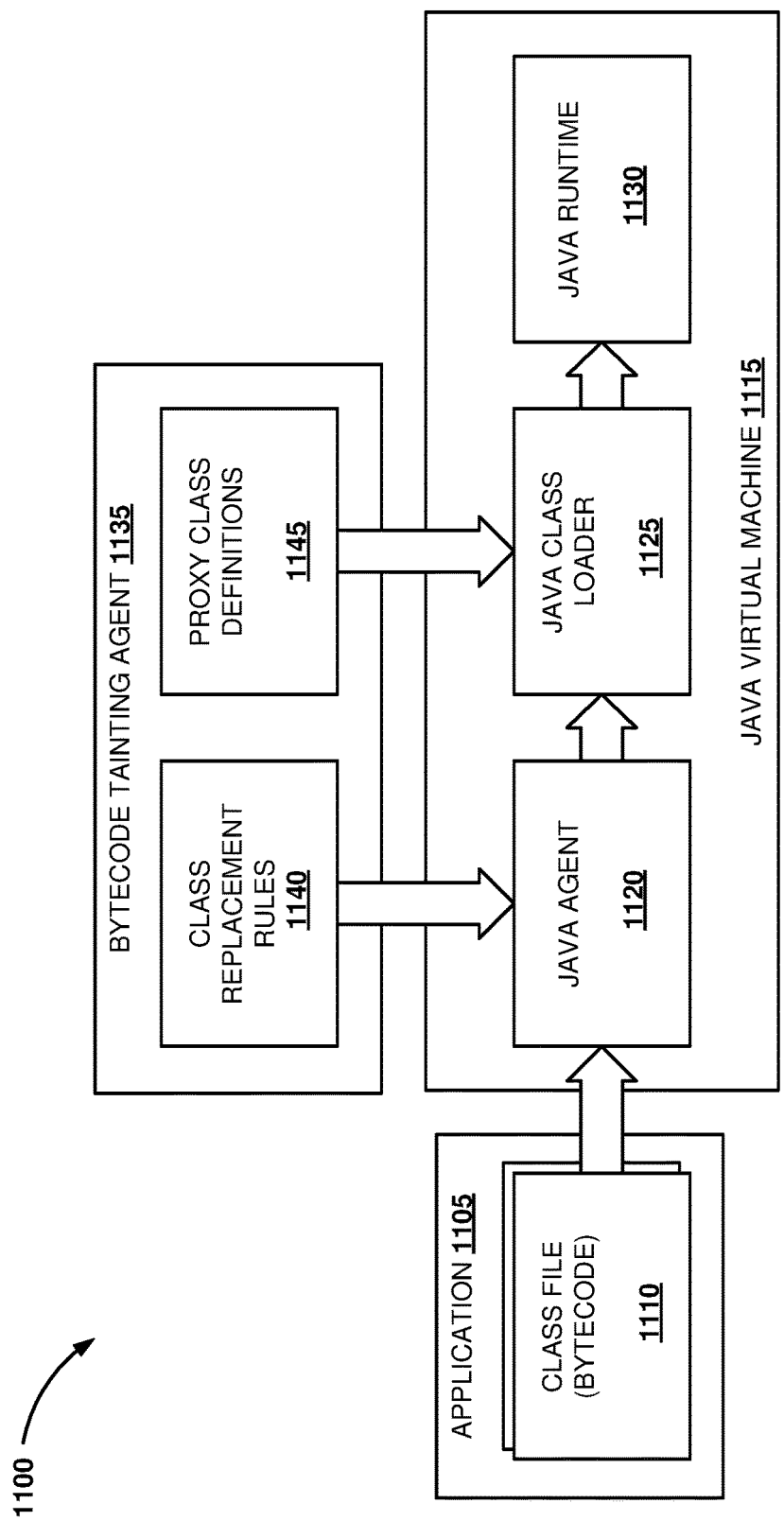
FIG. 11 is a block diagram illustrating a system dynamically instrumenting bytecode, according to one embodiment.

FIG. 11 shows system 1100 to dynamically or online instrumenting bytecode at loading, according to one embodiment. Class/es 1110 of application 1105 are loaded at JVM 1115 by Java class loader 1125. During the loading process, Java agent 1120, registered in the JVM 1115, interacts with the class loading mechanism (loader 1125). Bytecode tainting agent 1135 may be a resource (e.g., a ".jar" file) providing the functionality for dynamically replacing the original data class instances in the application bytecode with the corresponding taint-aware class instances, at loading. This functionality may include class replacement rules 1140 applied during the instrumentation of the application class files 1110.

Further, the bytecode tainting agent 1135 may include the definitions (1145) of the proxy taint-aware class/es (TString, TStringBuffer, TStringBuilder, etc.). Proxy class definitions 1145 may be implemented at the JVM 1115 directly by Java class loader 1125 following the usual execution as there may be no transformation of these definitions by the Java agent 1120. Application 1105, loaded and transformed in the described way, is executed at Java runtime 1130, tainting and taint tracking enabled. Java runtime may execute the methods of the standard data classes either as they are loaded by Java class loader 1125, or as they are internally defined (if any) in the JVM 515. Thanks to defining the taint-aware methods as wrappers or proxies to the original methods, the taint-tracking at the runtime (1130) is not affected. Furthermore, such taint-tracking mechanism is portable to other JVMs, as the JVMs are not altered by it. Just an argument or a configuration for the corresponding Java agent (e.g., one line reference) of a JVM would be added to support taint-tracking.

Figure 12:
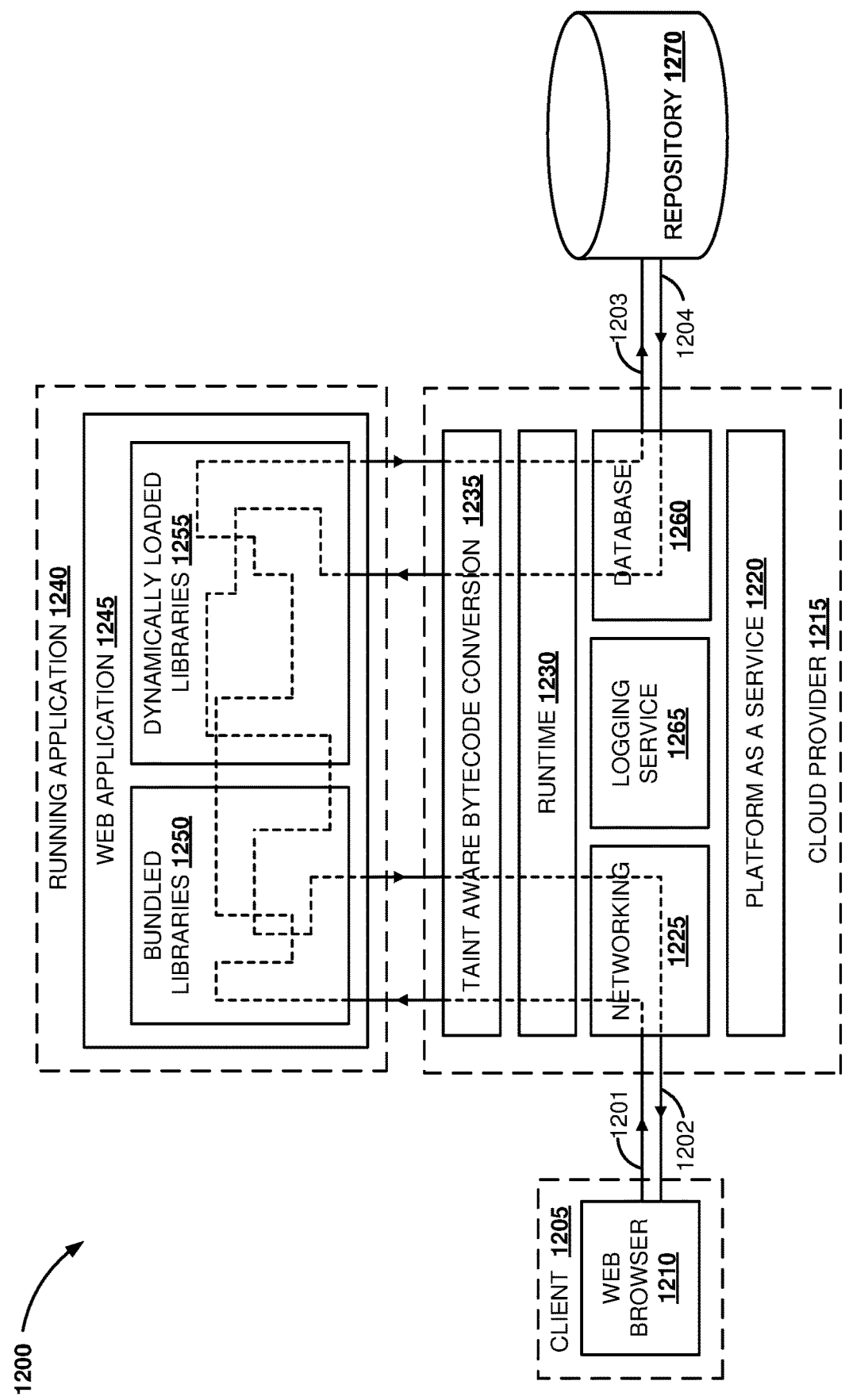
FIG. 12 is a block diagram illustrating cloud-based computing environment where taint-tracing is implemented, according to one embodiment.

FIG. 12 shows cloud-based environment 1200 where taint-tracking is implemented, according to one embodiment. For example, cloud provider 1215 delivers platform as a service (PaaS) 620 to customers. The services available at PaaS 1220 may include hardware and software resources for application development and execution. Further, integral cloud services are available to customers, such as networking 1225, logging 1265, database 1260, etc.

For example, networking 1225 provides networking resources through a centralized third-party provider operating inter-connected servers (e.g., cloud provider 1215 or a third-party customer of PaaS 1220, e.g., as network as a service). This involves connecting to a Wide Area Network (WAN) and/or other internet-based technology, to distribute content quickly and securely. Similarly, database 1260 can provide access to third-party storage services (e.g., secured by cloud provider 1215 or by a third-party customer of PaaS 1220, e.g., database as a service). Logging service 1265 can enable customers to manage, analyze, monitor, and gain insights from log data in real time. Logging service 665 may be established by cloud provider 1215 or/and by third-party cloud service providers (e.g., logging as a service).

Various execution platforms and application environments may be built on top of PaaS 1220 (e.g., by customers of PaaS 620) to run applications accessed by clients of the PaaS (1220) customers or by third-party clients. For example, the cloud (e.g., including PaaS 1220 and the additional system services such as networking 1225, database 1260 and logging 1265) may be used to host Java runtime 1230 (e.g., Java runtime environment (JRE), where JVM instance/s are executed). Various customers or/and third party provided applications may be executed at Java runtime 1235.

In one embodiment cloud run application 1240 may include web application 1245, where web application is accessible by clients (e.g., client 1205) via web browsers (e.g., web browser 1210). As a Java application, web application 1245 may rely upon a core set of functionalities provided by the application source (e.g., ".jar" file/s) and by core libraries bundled at startup (1250). Further, some of the functionality of web application 645 may be delivered by libraries loaded dynamically during execution (1255).

In one embodiment, cloud-based environment 1200 supports taint-tracking across the provided services and executed applications via non-intrusive application bytecode instrumentation. As shown in FIG. 12, the non-intrusive bytecode instrumentation may be delivered by taint-aware bytecode conversion module 1235 provided without altering Java runtime 1230. In one embodiment, Taint-aware bytecode conversion 1235 provides definitions to the taint-aware data classes to wrap around and proxy the original data classes (e.g., TString wrapping String). Further taint-aware bytecode conversion may instrument the application (web application 1245) to replace the instances of the original data class/es with corresponding instances of the taint-aware data class/es. This instrumentation may be executed via Java agent functionality of Java runtime 1230, during application start (e.g., instrumenting bundled libraries 1250 bytecode) or/and during execution (e.g., instrumenting dynamically loaded libraries 1255 at loading).

In one embodiment, client 1205, via web browser 610, may trigger a dataflow 1201 towards web application 1245 executed at cloud (cloud provider 1215). For example, the dataflow may result from a potentially malicious HTTP (Hypertext Transfer Protocol) request. Accordingly, dataflow 1201 may include metadata corresponding to taint information assigned to the dataflow either at client 1205 or at web application 1245. The taint metadata could be set, e.g., using a method defined for setting the taint metadata field of the corresponding taint-aware class instance. For example, we can add "setTaint" call by transforming the bytecode just after calls to the corresponding source function as part of 1235. The taint metadata can be tracked and managed during the execution of web application 1245 at cloud-based runtime 1230 thanks to replacing the original data class/es instances with corresponding taint-aware class/es instances.

If the execution of web application 1245 leads to a dataflow outside the web application (e.g., to a sink), the relevant metadata also can be transferred, e.g., using appropriately defined taint-aware class methods. Thus, web application 1245 may rely on database service 1260 to forward dataflow 1203 (resulting from data inflow 1201) to be processing at repository 1270. Dataflow 1203 may include tainting metadata to be used at repository 1270, e.g., to avoid security breaches. For example, dataflow 1203 may include SQL statement formed based on an input provided at web browser 1210 via dataflow 1201, paired with tainting metadata marking the SQL statement as tainted (e.g., see scenario 1 730 and 2 735 of FIG. 7). Warned by the tainting, repository 1270 may halt the execution of the SQL statement (1203), e.g., until being tested.

In one embodiment, tainting a variable or a string may be assigned not only to the user input to mark potential security risk, but as FIG. 12 shows, the tainting mechanism as established may be used to mitigate the risk of extracting and sending back to web browser 1210 inappropriate information, e.g., included in dataflows 1204 and 1202. Accordingly, dataflows 1204 and 1202 may include tainting metadata. Thus, the tainting framework implemented in cloud environment 1200 can monitor the result from the processing of dataflow 1203 and help mitigating the potential risks (e.g., exposure of sensitive information). The tainting metadata associated with dataflow 1204 is tracked and/or managed through web application 1245, and can be passed to client 1205, e.g., as associated with dataflow 1202.

In one embodiment, logging service 1265 may be used to store taint-relevant metadata from different stakeholders, different executing applications, etc. Such information could be processed in further analyses for different purposes, e.g., reporting, threat patterning, vulnerabilities identification, etc.

Some embodiments may include the described methods being written as one or more software components. These components, and the functionality associated with each, may be used by client, server, distributed, or peer computer systems. These components may be written in a computer language corresponding to one or more programming languages such as, functional, declarative, procedural, object-oriented, lower-level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components can be tangibly stored on a computer-readable storage medium as instructions. The term "computer-readable storage medium" should be taken to include a single medium or multiple media that stores one or more sets of instructions. The term "computer-readable storage medium" can be taken to include any one or more physical articles that are capable of undergoing a set of physical changes to physically store, encode, or otherwise carry a set of instructions for execution by a computer system which causes the computer system to perform any of the methods or process steps described, represented, or illustrated herein. Examples of computer-readable storage media include, but are not limited to magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer-readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 13:
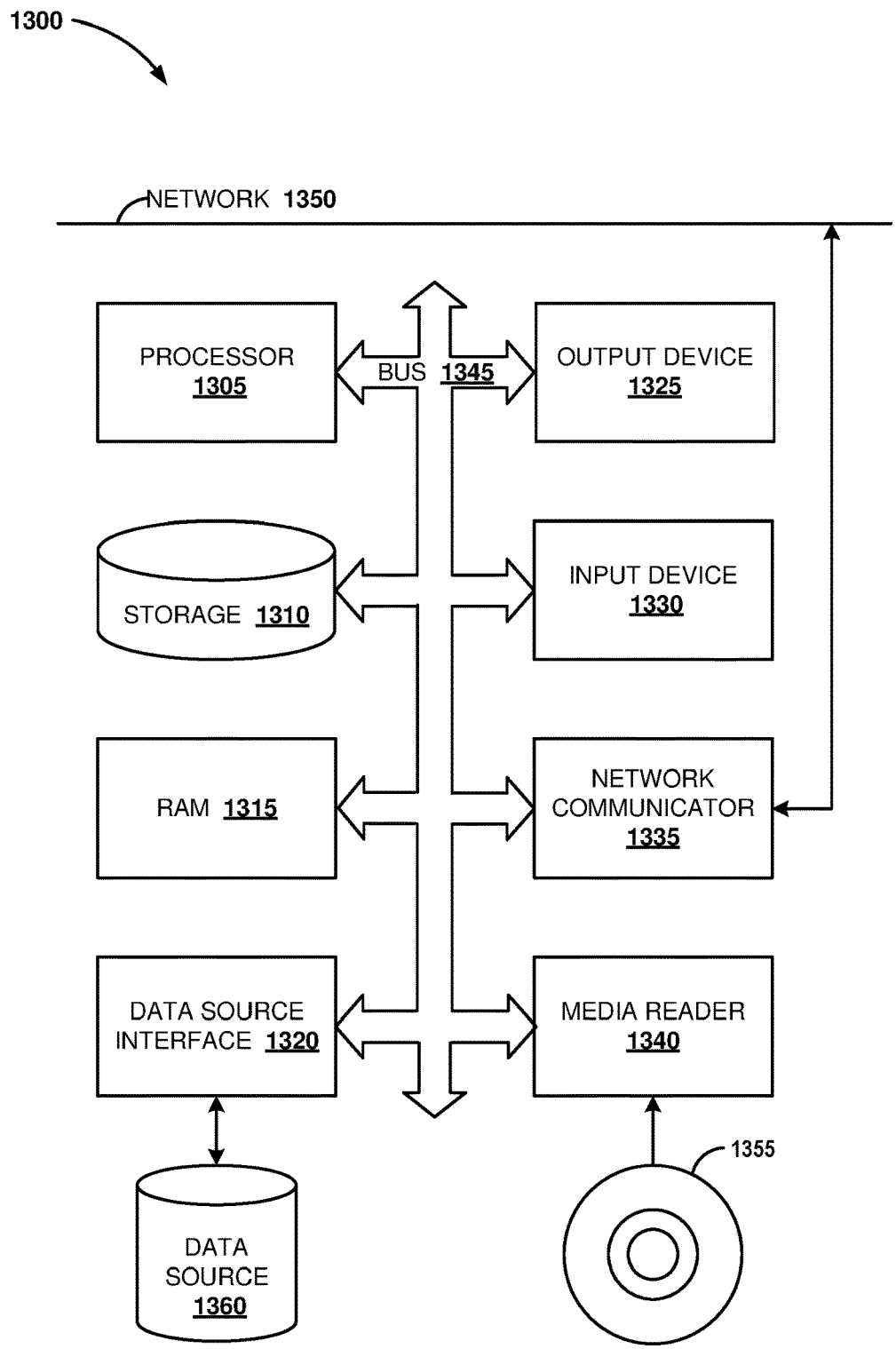
FIG. 13 is a block diagram of an example computer system to execute taint-tracking, according to one embodiment.

FIG. 13 is a block diagram of an example computer system 1300 system to execute taint-tracking, according to one embodiment. Computer system 1300 includes processor 1305 that executes software instructions or code stored on computer-readable storage medium 1355 to perform the above-illustrated methods. Computer system 1300 includes media reader 1340 to read the instructions from computer-readable storage medium 1355 and store the instructions in storage 1310 or in random access memory (RAM) 1315. Storage 1310 provides space for keeping static data where at least some instructions could be stored for later execution. The stored instructions may be further compiled to generate other representations of the instructions and dynamically stored in RAM 1315. Processor 1305 reads instructions from RAM 1315 and performs actions as instructed. According to one embodiment, computer system 1300 further includes output device 1325 (e.g., a display) to provide at least some of the results of the execution as output including, but not limited to, visual information to users; and input device 1330 to provide a user or another device with means for entering data and/or otherwise interact with computer system 1300. Output device 1325 and input device 1330 could be joined by one or more additional peripherals to further expand the capabilities of computer system 1300. Network communicator 1335 may be provided to connect computer system 1300 to network 1350 and in turn to other devices connected to network 1350 including other clients, servers, data stores, and interfaces, for instance. The modules of computer system 1300 are interconnected via bus 1345. Computer system 1300 includes data source interface 1320 to access data source 1360. Data source 1360 can be accessed via one or more abstraction layers implemented in hardware or software. For example, data source 1360 may be accessed via network 1350. In some embodiments data source 1360 may be accessed by an abstraction layer, such as, a semantic layer.

A data source can be an information resource. Data sources include sources of data that enable data storage and retrieval. Data sources may include databases, such as, relational, transactional, hierarchical, multi-dimensional (e.g., OLAP), object-oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Example 21—Example Implementations

Any of the following can be implemented.

Clause 1. A computer-implemented method comprising:

via instrumentation within a cloud application, tracking which data incorporated in an executable statement originates as input data from a client computer, wherein the data incorporated in the executable statement and originating as input data from the client computer is designated as tainted data;

generating a mock executable statement, wherein generating the mock executable statement comprises incorporating the tainted data into a syntax attack detection template;

detecting syntax manipulation by the tainted data in the mock executable statement; and responsive to detecting syntax manipulation by the tainted data, generating an alert indicating that syntax of the mock executable statement has been manipulated by the tainted data.

Clause 2. The method of Clause 1, wherein:

instrumentation is performed by a taint-aware class that is substituted for an original class in the cloud application.

Clause 3. The method of any one of Clauses 1-2, wherein:

tracking which data incorporated in an executable statement originates as input data from a client computer comprises:

intercepting a Structured Query Language (SQL) query generated by the cloud application.

Clause 4. The method of any one of Clauses 1-3, wherein:

instrumentation is performed non-intrusively.

Clause 5. The method of any one of Clauses 1-4, further comprising:

determining whether the syntax manipulation is categorized as malicious or malformed;

wherein the alert indicates whether the syntax manipulation is categorized as malicious or malformed.

Clause 6. The method of any one of Clauses 1-5, wherein:

the cloud application comprises code injection attack blocking functionality that blocks a given code injection attack; and syntax manipulation by the tainted data in the mock executable statement is detected;

whereby an attempted attack is separately detected via the mock executable statement even though the attempted attack is blocked by the cloud application.

Clause 7. The method of any one of Clauses 1-6, wherein:
generating the mock executable statement comprises incorporating the tainted data in place of a parameter of the syntax attack detection template.

Clause 8. The method of any one of Clauses 1-7, wherein:
the data to be included in the executable statement originates as string data received from the client computer in response to an HTML form.

Clause 9. The method of any one of Clauses 1-8, wherein:
the mock executable statement comprises an SQL statement in string form.

Clause 10. The method of any one of Clauses 1-9, wherein:
detecting syntax manipulation comprises:
parsing the mock executable statement into multiple parsed tokens based on syntax of a language of the executable statement;
determining that a unit of tainted data spans more than one parsed token.

Clause 11. The method of Clause 10, wherein:
the parsing parses into keywords and literals; and
determining that a unit of tainted data spans more than one parsed token comprises determining that the unit spans a keyword-literal boundary.

Clause 12. The method of any one of Clauses 1-11, wherein:
detecting syntax manipulation comprises:
parsing the mock executable statement into multiple parsed tokens based on syntax of a language of the executable statement;
determining that a unit of tainted data increases a number of parsed tokens as compared to the syntax attack detection template.

Clause 13. The method of any one of Clauses 1-12, further comprising:
responsive to the alert, locking an account of a user that was used for sending an incoming request that provided the input data from the client computer.

Clause 14. The method of any one of Clauses 1-13, further comprising:
responsive to the alert, assembling details of an incoming request that provided the input data from the client computer; and
sending the details to an incident response destination.

Clause 15. A computing system comprising:
at least one hardware processor;
at least one memory coupled to the at least one hardware processor;
an executable application configured to receive input from a browser;
a stored syntax attack detection template;
a tainting engine configured to identify an input string received by the executable application from the browser that is incorporated into an executable statement generated by the executable application, wherein the tainting engine is further configured to generate a mock executable statement comprising the input string incorporated into a syntax attack detection template, determine that the input string manipulates syntax of the mock executable statement, and generate an alert upon determining that the input string does manipulate syntax of the mock executable statement.

Clause 16. The computing system of Clause 15 wherein:
non-intrusive instrumentation within the executable application detects the input string and provides the input string to the tainting engine.

Clause 17. The computing system of any one of Clauses 15-16 wherein:
the tainting engine is configured to determine whether syntax manipulation by the input string is categorized as malicious or malformed, wherein a determination of malformed is indicated by introduction of a syntax error; and
wherein the alert indicates whether the syntax manipulation is categorized as malicious or malformed.

Clause 18. The computing system of any one of Clauses 15-17 wherein:
the executable application is configured to successfully block an attack of an attack type detected by the tainting engine; and
the tainting engine separately detects the attack.

Clause 19. The computing system of any one of Clauses 15-18 further comprising:
a reverse proxy configured to collect details regarding a session from which the input string originated.

Clause 20. One or more non-transitory computer-readable media comprising computer-executable instructions that, when executed by a computing system, cause the computing system to perform operations comprising:
via non-intrusive instrumentation within a cloud application configured to communicate with a client-side browser, identifying input string data received from the client-side browser that is included in an executable statement generated by the cloud application;
generating a mock executable SQL statement, wherein generating the mock executable SQL statement comprises incorporating the input string data into a syntax attack detection template;
detecting syntax manipulation by the input string data in the mock executable SQL statement, wherein the syntax manipulation comprises alteration by the input string data of syntax structure of the mock executable SQL statement; and
responsive to detecting the syntax manipulation by the input string data, sending an alert indicative of an attempted malicious attack against the cloud application.

Clause 21. One or more non-transitory computer-readable media comprising computer-executable instructions that, when executed by a computing system, cause the computing system to perform the method of any one of Clauses 1-14.

Example 22—Example Advantages

A number of advantages can be achieved via the technologies described herein. For example, a variety of different attack types can be supported, including cross-site scripting, code injection attacks, or the like. Further, early probing (e.g., precursors to other attack types) by a threat actor that results in simple syntax errors can also be detected.

The technologies can allow an application to detect and report injection attacks, which are a very popular exploitation technique, even if the application was coded securely, under the rationale that a threat actor trying injection attacks might eventually discover an exploitable weakness. It further enables information gathering of the threat actor (e.g., via the attached HTTP request), both accelerating intrusion detection and enabling use of cyber-deception techniques such as replaying the attack against a honeypot.

Detecting an attempted attack in and of itself is a practical application of the technologies with benefit because knowing of the attempted attack can be valuable information in a network security context. For example, the attempted attack can be simply logged for future reference, increased scrutiny can be placed on the related user account or IP address, or other countermeasures can be taken, such as locking the account, throttling the session, or redirecting the session to a honeypot.

Although SQL injection attacks are described, the technologies can be enhanced to address other types of injection attacks such as cross-site-scripting. One approach for stored XSS would be to add one or more templates as described above and parse the output of the template with the inserted user input against a DOM parser to detect the injection of extra elements, with the same tainting technique used to detect SQL injections in constructed SQL queries:

Example 23—Example Computing Systems

Figure 14:
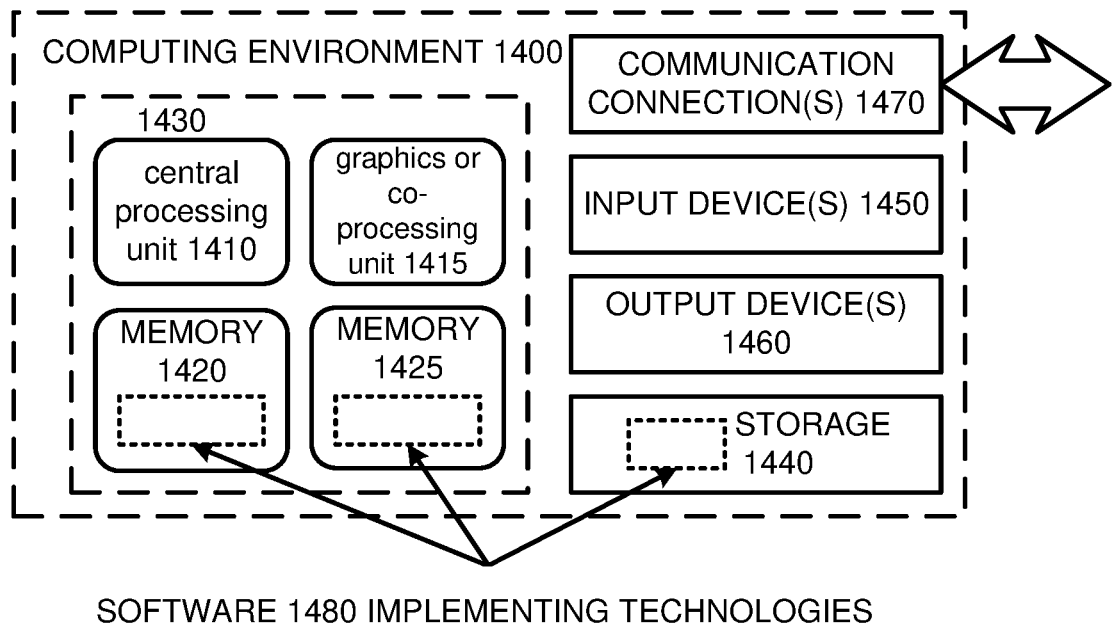
FIG. 14 is a block diagram of an example computing system in which described embodiments can be implemented.

FIG. 14 depicts an example of a suitable computing system 1400 in which the described innovations can be implemented. The computing system 1400 is not intended to suggest any limitation as to scope of use or functionality of the present disclosure, as the innovations can be implemented in diverse computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 can be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 can have additional features. For example, the computing system 1400 includes storage 1440, one or more input devices 1450, one or more output devices 1460, and one or more communication connections 1470, including input devices, output devices, and communication connections for interacting with a user. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 can be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 can be an input device such as a keyboard, mouse, pen, or trackball, a voice input device, a scanning device, touch device (e.g., touchpad, display, or the like) or another device that provides input to the computing system 1400. The output device(s) 1460 can be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 24—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 25—Example Cloud Computing Environment

Figure 15:
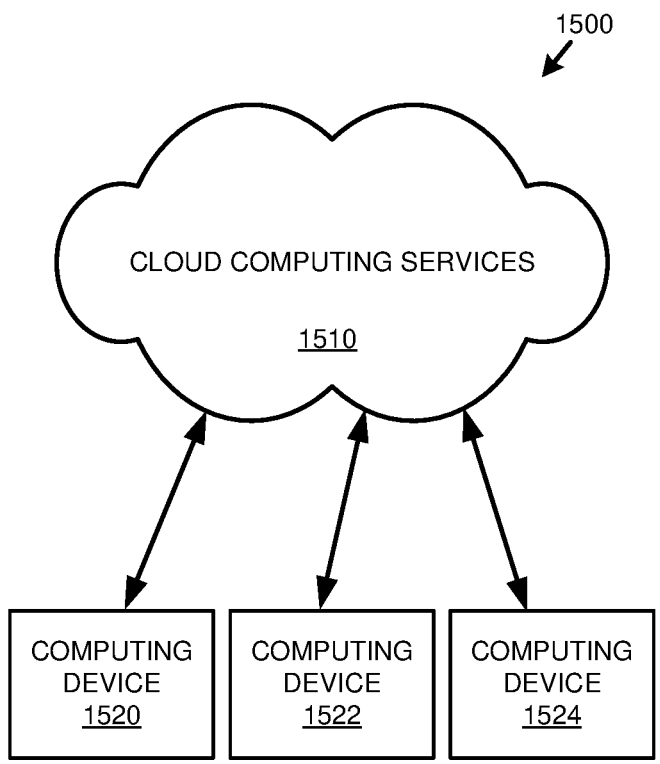
FIG. 15 is a block diagram of an example cloud computing environment that can be used in conjunction with the technologies described herein.

FIG. 15 depicts an example cloud computing environment 1500 in which the described technologies can be implemented, including, e.g., the system 100 of FIG. 1 and other systems herein. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

In practice, cloud-based, on-premises-based, or hybrid scenarios can be supported.

Example 26—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 27—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
via instrumentation within a cloud application, tracking which data incorporated in an executable statement originates as input data from a client computer, wherein the data incorporated in the executable statement and originating as input data from the client computer is designated as tainted data;
generating a mock executable statement, wherein generating the mock executable statement comprises incorporating the tainted data into a syntax attack detection template;
detecting syntax manipulation by the tainted data in the mock executable statement; and
responsive to detecting syntax manipulation by the tainted data, generating an alert indicating that syntax of the mock executable statement has been manipulated by the tainted data,
wherein the cloud application comprises code injection attack blocking functionality that blocks a given code injection attack; and syntax manipulation by the tainted data in the mock executable statement is detected; whereby an attempted attack is separately detected via the mock executable statement even though the attempted attack is blocked by the cloud application.

2. The method of claim 1, wherein:
instrumentation is performed by a taint-aware class that is substituted for an original class in the cloud application.

3. The method of claim 1, wherein:
tracking which data incorporated in an executable statement originates as input data from a client computer comprises:
intercepting a Structured Query Language (SQL) query generated by the cloud application.

4. The method of claim 1, wherein:
instrumentation is performed non-intrusively.

5. The method of claim 1, further comprising:
determining whether the syntax manipulation is categorized as malicious or malformed;
wherein the alert indicates whether the syntax manipulation is categorized as malicious or malformed.

6. The method of claim 1, wherein:
generating the mock executable statement comprises incorporating the tainted data in place of a parameter of the syntax attack detection template.

7. The method of claim 1, wherein:
the data to be included in the executable statement originates as string data received from the client computer in response to an HTML form.

8. The method of claim 1, wherein:
the mock executable statement comprises an SQL statement in string form.

9. The method of claim 1, wherein:
detecting syntax manipulation comprises:
parsing the mock executable statement into multiple parsed tokens based on syntax of a language of the executable statement;
determining that a unit of tainted data spans more than one parsed token.

10. The method of claim 9, wherein:
the parsing parses into keywords and literals; and
determining that a unit of tainted data spans more than one parsed token comprises determining that the unit spans a keyword-literal boundary.

11. The method of claim 1, wherein:
detecting syntax manipulation comprises:
parsing the mock executable statement into multiple parsed tokens based on syntax of a language of the executable statement;
determining that a unit of tainted data increases a number of parsed tokens as compared to the syntax attack detection template.

12. The method of claim 1, further comprising:
responsive to the alert, locking an account of a user that was used for sending an incoming request that provided the input data from the client computer.

13. The method of claim 1, further comprising:
responsive to the alert, assembling details of an incoming request that provided the input data from the client computer; and
sending the details to an incident response destination.

14. A computing system comprising:
at least one hardware processor;
at least one memory coupled to the at least one hardware processor;
an executable application configured to receive input from a browser;
a stored syntax attack detection template;
a tainting engine configured to identify an input string received by the executable application from the browser that is incorporated into an executable statement generated by the executable application, wherein the tainting engine is further configured to generate a mock executable statement comprising the input string incorporated into a syntax attack detection template, determine that the input string manipulates syntax of the mock executable statement, and generate an alert upon determining that the input string does manipulate syntax of the mock executable statement, wherein the executable application is configured to successfully block an attack of an attack type detected by the tainting engine; and the tainting engine separately detects the attack.

15. The computing system of claim 14 wherein:

non-intrusive instrumentation within the executable application detects the input string and provides the input string to the tainting engine.

16. The computing system of claim 14 wherein:

the tainting engine is configured to determine whether syntax manipulation by the input string is categorized as malicious or malformed, wherein a determination of malformed is indicated by introduction of a syntax error; and wherein the alert indicates whether the syntax manipulation is categorized as malicious or malformed.

17. The computing system of claim 14 further comprising:

a reverse proxy configured to collect details regarding a session from which the input string originated.

18. One or more non-transitory computer-readable media comprising computer-executable instructions that, when executed by a computing system, cause the computing system to perform operations comprising:

via non-intrusive instrumentation within a cloud application configured to communicate with a client-side browser, identifying input string data received from the client-side browser that is included in an executable statement generated by the cloud application;

generating a mock executable SQL statement, wherein generating the mock executable SQL statement comprises incorporating the input string data into a syntax attack detection template;

detecting syntax manipulation by the input string data in the mock executable SQL statement, wherein the syntax manipulation comprises alteration by the input string data of syntax structure of the mock executable SQL statement; and responsive to detecting the syntax manipulation by the input string data, sending an alert indicative of an attempted malicious attack against the cloud application, wherein the cloud application comprises code injection attack blocking functionality that blocks a given code injection attack; and syntax manipulation by the input string data in the mock executable SQL statement is detected; whereby an attempted attack is separately detected via the mock executable SQL statement even though the attempted attack is blocked by the cloud application.

* * * * *